United States Patent
Fukagai et al.

(10) Patent No.: US 11,080,812 B2
(45) Date of Patent: Aug. 3, 2021

(54) IMAGE RECOGNITION APPARATUS AND IMAGE RECOGNITION METHOD FOR SORTING CANDIDATE REGIONS DETECTED IN IMAGE

(71) Applicant: FUJITSU LIMITED, Kawasaki (JP)

(72) Inventors: Takuya Fukagai, Atsugi (JP); Kyosuke Maeda, Shizuoka (JP); Koichi Shirahata, Yokohama (JP); Yasumoto Tomita, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 106 days.

(21) Appl. No.: 16/543,668

(22) Filed: Aug. 19, 2019

(65) Prior Publication Data

US 2020/0074690 A1    Mar. 5, 2020

(30) Foreign Application Priority Data

Aug. 30, 2018    (JP) .............................. JP2018-161464

(51) Int. Cl.
*G06T 1/20*    (2006.01)
*G06T 7/70*    (2017.01)
(Continued)

(52) U.S. Cl.
CPC .................. *G06T 1/20* (2013.01); *G06T 1/60* (2013.01); *G06T 7/70* (2017.01); *G06T 7/11* (2017.01); *G06T 2210/52* (2013.01)

(58) Field of Classification Search
CPC ..... G06T 1/20; G06T 1/60; G06T 7/11; G06T 7/70; G06T 2210/52

See application file for complete search history.

(56) References Cited

U.S. PATENT DOCUMENTS 6,856,696 B1    2/2005 Ajioka
2015/0161474 A1*    6/2015 Jaber .................... G06K 9/4671
382/203

(Continued)

FOREIGN PATENT DOCUMENTS

JP    2001-148023    5/2001
JP    2017-4480    1/2017

OTHER PUBLICATIONS

T. Fukagai et al., "Speed-Up of Object Detection Neural Network with GPU," 2018 25th IEEE International Conference on Image Processing (ICIP), Athens, 2018, pp. 301-305, doi: 10.1109/ICIP.2018.8451814. (Year: 2018).*

(Continued)

*Primary Examiner* — Justin P. Misleh
(74) *Attorney, Agent, or Firm* — Fujitsu Patent Center

(57) ABSTRACT

An image recognition apparatus includes a processor including a plurality of arithmetic units; and a memory storing a plurality of data elements, each corresponding to one of candidate regions detected in an image and indicating a location and an evaluation value of the corresponding candidate region. The processor sorts the data elements by calculating in parallel, in reference to evaluation values, indexes each indicating a position of a corresponding one of the data elements in a sorted ordering and transferring in parallel, after the calculation of the indexes, the data elements based on the indexes. The processor selects part of the candidate regions based on the sorted ordering of the data elements.

9 Claims, 30 Drawing Sheets

(51) Int. Cl.
     *G06T 1/60*   (2006.01)
     *G06T 7/11*   (2017.01)

(56) References Cited

U.S. PATENT DOCUMENTS

2016/0358035 A1    12/2016  Ruan et al.
2020/0364289 A1*   11/2020  Cui .......................... G06F 9/50

OTHER PUBLICATIONS

Nadathur Satish, Mark Harris and Michael Garland, "Designing efficient sorting algorithms for manycore gpus", Proceedings of the 23rd IEEE International Parallel and Distributed Processing Symposium, May 2009. (Year: 2009).*

Nikolaj Leischner, Vitaly Osipov and Peter Sanders, "GPU sample sort", IEEE 24th International Parallel and Distributed Processing Symposium, pp. 1-10, 2010. (Year: 2010).*

Nadathur Satish, Changkyu Kim, Jatin Chhugani, Anthony D. Nguyen, Victor W. Lee, Daehyun Kim, et al., "Fast sort on cpus and gpus: A case for bandwidth oblivious simd sort", Proceedings of the 2010 ACM SIGMOD International Conference on Management of data, pp. 351-362, 2010. (Year: 2010).*

Andrew Davidson, David Tarjan, Michael Garland and John D. Owens, "Efficient parallel merge sort for fixed and variable length keys", Proceedings of the 23rd IEEE International Parallel and Distributed Processing Symposium, pp. 131-139, May 2012. (Year: 2012).*

Hagen Peters, Ole Schulz-Hildebrandt and Norbert Lut-tenberger, "A novel sorting algorithm for many-core architectures based on adaptive bitonic sort", IEEE 26th International Parallel and Distributed Processing Symposium, pp. 227-237, 2012. (Year: 2012).*

Harvey, Jesse Patrick, "GPU acceleration of object classification algorithms using NVIDIA CUDA" (2009). Thesis. Rochester Institute of Technology. (Year: 2009).*

Ross Girshick et al., "Rich feature hierarchies for accurate object detection and semantic segmentation", Proceedings of the 2014 IEEE Conference on Computer Vision and Pattern Recognition (CVPR), Jun. 2014 (9 pages).

Ross Girshick, "Fast R-CNN", Proceedings of the 2015 IEEE International Conference on Computer Vision (ICCV), Sep. 2015 (10 pages).

Shaoqing Ren et al., "Faster R-CNN: Towards Real-Time Object Detection with Region Proposal Networks", Proceedings of the Advances in Neural Information Processing Systems 28 (NIPS 2015), Dec. 2015 (12 pages).

Shaoqing Ren et al., "Faster R-CNN: Towards Real-Time Object Detection with Region Proposal Networks", arXiv:1506.01497v3, Jan. 6, 2016 (15 pages).

* cited by examiner

SCORE-ASSOCIATED LOCATION DATA 141

| SCORE | MIN X | MIN Y | MAX X | MAX Y |
|---|---|---|---|---|
| 0.9 | 150 | 300 | 400 | 450 |
| 0.01 | 200 | 200 | 250 | 250 |
| 0.02 | 150 | 250 | 200 | 300 |
| 0.7 | 300 | 300 | 350 | 450 |
| ... | ... | ... | ... | ... |

SCORE-ASSOCIATED LOCATION DATA 141

| SCORE | MIN X | MIN Y | MAX X | MAX Y |
|---|---|---|---|---|
| 0.9 | 150 | 300 | 400 | 450 |
| 0.7 | 300 | 300 | 350 | 450 |
| ... | ... | ... | ... | ... |
| 0.02 | 150 | 250 | 200 | 300 |
| 0.01 | 200 | 200 | 250 | 250 |

SCORE-ASSOCIATED LOCATION DATA 151

| SCORE | MIN X | MIN Y | MAX X | MAX Y |
| --- | --- | --- | --- | --- |
| 0.99 | 100 | 100 | 200 | 200 |
| 0.97 | 0 | 10 | 50 | 60 |
| 0.95 | 200 | 200 | 300 | 300 |
| 0.94 | 400 | 50 | 450 | 100 |
| ... | ... | ... | ... | ... |
| 0.07 | 100 | 90 | 210 | 190 |
| 0.05 | 10 | 10 | 50 | 50 |
| 0.02 | 190 | 190 | 290 | 310 |
| 0.01 | 390 | 40 | 440 | 110 |

SCORE-ASSOCIATED LOCATION DATA 151

| SCORE | MIN X | MIN Y | MAX X | MAX Y |
| --- | --- | --- | --- | --- |
| 0.99 | 100 | 100 | 200 | 200 |
| 0.97 | 0 | 10 | 50 | 60 |
| 0.95 | 200 | 200 | 300 | 300 |
| 0.94 | 400 | 50 | 450 | 100 |
| ... | ... | ... | ... | ... |

IMAGE RECOGNITION APPARATUS AND IMAGE RECOGNITION METHOD FOR SORTING CANDIDATE REGIONS DETECTED IN IMAGE

CROSS-REFERENCE TO RELATED APPLICATION

This application is based upon and claims the benefit of priority of the prior Japanese Patent Application No. 2018-161464, filed on Aug. 30, 2018, the entire contents of which are incorporated herein by reference.

FIELD

The embodiments discussed herein are related to an apparatus and method for image recognition.

BACKGROUND

There are known image recognition techniques for detecting the locations and classes of individual objects in an input image. Some image recognition techniques employ neural networks, such as pre-trained convolutional neural networks (CNNs). For example, region-based convolutional neural network (R-CNN) and fast R-CNN methods have been proposed.

On the other hand, there is a proposed visual apparatus that calculates the number of moving and stationary objects captured in an input image. The proposed visual apparatus extracts edge information from the input image, separates regions bounded based on the edge information from the background, and determines, based on the size and location of each separated region, regions with objects and counts the objects. There is also a proposed saliency information acquisition apparatus for detecting saliency regions of high importance from an input image. The proposed saliency information acquisition apparatus sets a plurality of candidate regions on the input image, calculates a local feature value for each pixel based on local information of the pixel, and calculates a global feature value indicating a feature of each candidate region in relation to the entire input image. The saliency information acquisition apparatus evaluates each candidate region based on local and global feature values associated with the candidate region.

See, for example, the following documents:
Japanese Laid-open Patent Publications No. 2001-148023;
Japanese Laid-open Patent Publications No. 2017-4480;
Ross Girshick, Jeff Donahue, Trevor Darrell and Jitendra Malik, "Rich feature hierarchies for accurate object detection and semantic segmentation", Proceedings of the 2014 IEEE Conference on Computer Vision and Pattern Recognition (CVPR), pp. 580-587, June 2014;
Ross Girshick, "Fast R-CNN", Proceedings of the 2015 IEEE International Conference on Computer Vision (ICCV), pp. 1440-1448, December 2015; and
Shaoqing Ren, Kaiming He, Ross Girshick and Jian Sun, "Faster R-CNN: Towards Real-Time Object Detection with Region Proposal Networks", Proceedings of the Advances in Neural Information Processing Systems 28 (NIPS 2015), pp. 91-99, December 2015.

In the course of some image recognition tasks, region selection is made by extracting a large number of candidate regions likely to include objects, calculating an evaluation value for each candidate region, and then selecting candidate regions with high evaluation values. This process may involve sorting (arranging) data elements corresponding to the candidate regions according to the evaluation values. When a large number of candidate regions are handled, sorting the candidate regions entails heavy workload.

On the other hand, image processors, such as graphics processing units (GPUs) or general purpose GPUs (GPGPUs), having a large number of arithmetic units and capable of running a large number of threads in parallel may be employed for image recognition tasks. However, there remains a problem that the application of conventional sort algorithms, which emphasize a reduction in the total computational effort while using a small number of threads run by a central processing unit (CPU), has little effect in increasing the speed of sorting candidate regions with the use of an image processor.

SUMMARY

According to one aspect, there is provided an image recognition apparatus including a processor configured to include a plurality of arithmetic units; and a memory configured to store a plurality of data elements, each corresponding to one of a plurality of candidate regions detected in an image and indicating a location and an evaluation value of the corresponding candidate region. The processor executes a process including sorting the plurality of data elements by calculating in parallel, using the plurality of arithmetic units, indexes each indicating a position of a corresponding one of the plurality of data elements in a sorted ordering, in reference to an evaluation value of the corresponding one of the plurality of data elements and evaluation values of at least part of other data elements, and transferring in parallel, after the indexes are calculated, the plurality of data elements based on the indexes using the plurality of arithmetic units; and selecting part of the plurality of candidate regions based on the sorted ordering of the plurality of data elements.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

(a) First Embodiment

This part of the description explains a first embodiment.

Figure 1:
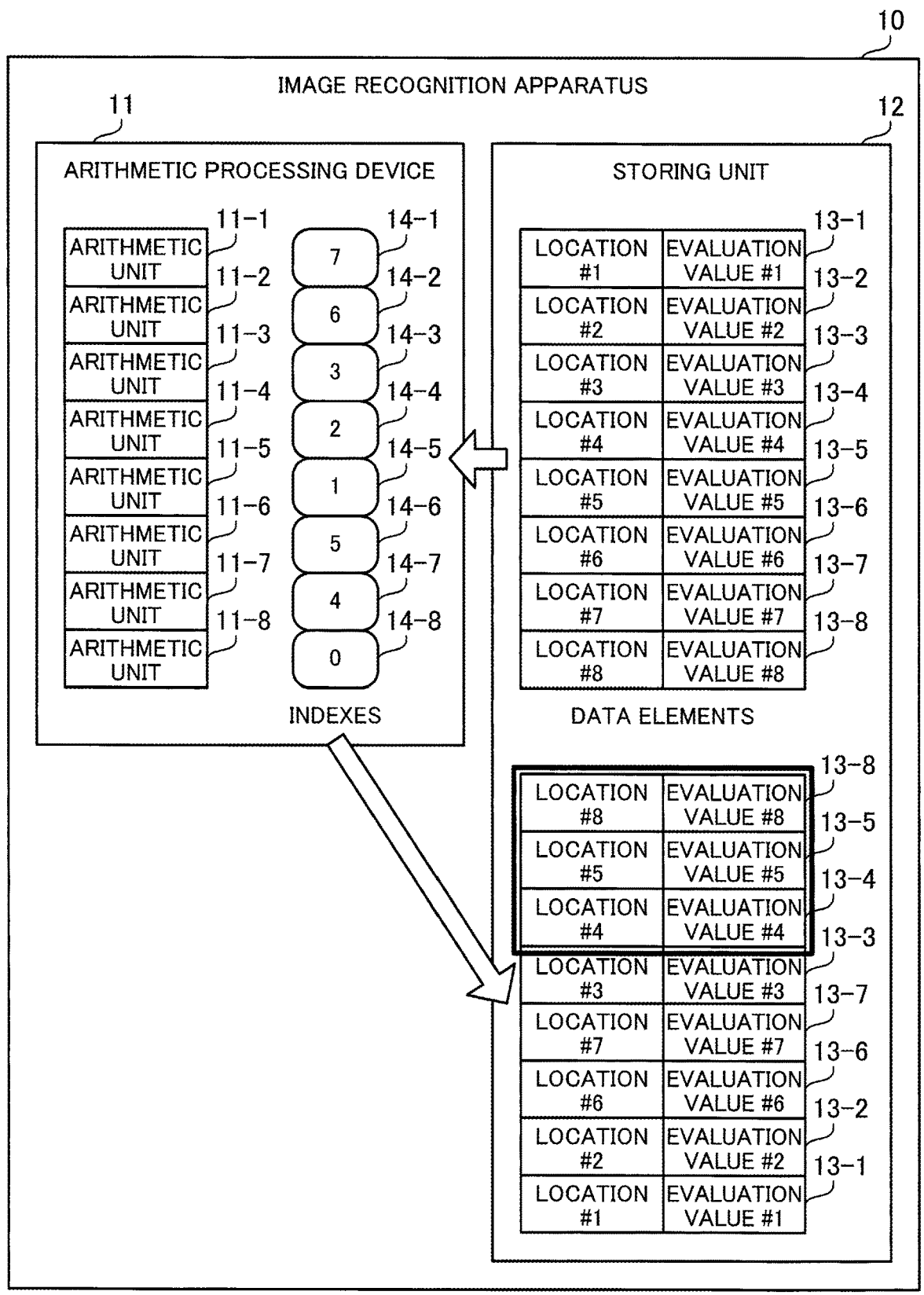
FIG. 1 illustrates an exemplary image recognition apparatus according to a first embodiment.

FIG. 1 illustrates an exemplary image recognition apparatus according to the first embodiment.

An image recognition apparatus 10 of the first embodiment receives an image and detects the locations and classes of individual objects in the received image. The image recognition apparatus 10 may be a client device, such as a personal digital assistant or in-vehicle terminal, or a server device that communicates with, for example, a remote image pickup device, a client device, and/or a different server device via a network. The image to be analyzed may be an image captured just before the analysis or a stored image.

The image recognition apparatus 10 includes an arithmetic processing device 11 and a storing unit 12.

The arithmetic processing device 11 includes a plurality of arithmetic units including arithmetic units 11-1 to 11-8. The arithmetic units 11-1 to 11-8 are processing cores capable of running threads in parallel. Preferably, the arithmetic processing device 11 is capable of running as many as thousands of threads or more in parallel. For example, the arithmetic units 11-1 to 11-8 are processing cores included in a GPU. Note that a single arithmetic unit may execute two or more logical threads, for example, utilizing a pipeline processing technique.

The storing unit 12 stores therein a plurality of data elements including data elements 13-1 to 13-8. The data elements 13-1 to 13-8 may also be referred to as records, entries, or unit datasets. The storing unit 12 is, for example, semiconductor memory, and may be included in a GPU. The data elements 13-1 to 13-8 correspond to candidate regions extracted from the image. Different data elements correspond to different candidate regions. Each candidate region is an image region which may contain an object to be detected. For example, candidate regions are extracted from the image, and an evaluation value is calculated for each of the extracted candidate regions based on feature information of the image.

Each of the data elements 13-1 to 13-8 includes the location and evaluation value of the corresponding candidate region. The location indicates the relative position of the candidate region within the image. If each candidate region is rectangular, its location is defined by, for example, the x and y coordinates of the upper left vertex and those of the lower right vertex. Alternatively, the location may be defined by, for example, the x and y coordinates of the upper left vertex and the width and height of the candidate region. The evaluation values may also be referred to as scores or index values. For example, a higher evaluation value means that its corresponding candidate region is more highly rated, and indicates a higher likelihood that the candidate region contains an object to be detected.

Upon generation of the data elements 13-1 to 13-8, they are not sorted by their evaluation values. On the other hand, as many as thousands of candidate regions may be extracted from a single image, and thus as many as thousands of data elements may be stored in the storing unit 12. In view of this, the arithmetic processing device 11 sorts (arranges) the data elements 13-1 to 13-8 by the evaluation values, which allows narrowing of the candidate regions later in image recognition processing. For example, the arithmetic processing device 11 sorts the data elements in descending order of the evaluation values.

In sorting the data elements 13-1 to 13-8, the arithmetic processing device 11 uses the arithmetic units 11-1 to 11-8 to calculate in parallel indexes 14-1 to 14-8, respectively. The indexes 14-1 to 14-8 indicate the positions of the corresponding data elements 13-1 to 13-8 in a sorted ordering. The indexes 14-1 to 14-8 may also be referred to as position information. The index of a data element is calculated based on comparisons of the evaluation value of the data element against the evaluation values of at least part of the other data elements. The index of a different data element may be calculated by a thread of a different arithmetic unit. Note however that one arithmetic unit may calculate several indexes using several logical threads. That is, the relationship of the arithmetic units and the data elements may be either one-to-one or one-to-many.

Assume, for example, that amongst the set of data elements, the data element 13-1 currently comes first; the data element 13-2 second; the data element 13-3 third; the data element 13-4 fourth; the data element 13-5 fifth; the data element 13-6 sixth; the data element 13-7 seventh; and the data element 13-8 eighth.

The arithmetic unit 11-1 compares the evaluation value of the data element 13-1 against the evaluation values of other data elements to then calculate the index 14-1 corresponding to the data element 13-1 and return "7". The calculation of the index 14-1 is implemented, for example, by counting data elements having higher evaluation values than the data element 13-1.

The arithmetic unit 11-2 calculates the index 14-2 corresponding to the data element 13-2 and returns "6". The arithmetic unit 11-3 calculates the index 14-3 corresponding to the data element 13-3 and returns "3". The arithmetic unit 11-4 calculates the index 14-4 corresponding to the data element 13-4 and returns "2". The arithmetic unit 11-5 calculates the index 14-5 corresponding to the data element 13-5 and returns "1". The arithmetic unit 11-6 calculates the index 14-6 corresponding to the data element 13-6 and returns "5". The arithmetic unit 11-7 calculates the index 14-7 corresponding to the data element 13-7 and returns "4". The arithmetic unit 11-8 calculates the index 14-8 corresponding to the data element 13-8 and returns "0". Note that the indexes 14-1 to 14-8 are integers, starting from 0.

Until the calculation of the indexes 14-1 to 14-8 is finished, the data elements 13-1 to 13-8 are not actually moved. After the indexes 14-1 to 14-8 are calculated, the arithmetic processing device 11 uses the arithmetic units 11-1 to 11-8 to transfer the data elements 13-1 to 13-8 in parallel based on the indexes 14-1 to 14-8. That is, the phase for calculating the positions of data elements in a sorted ordering and the phase for transferring the data elements are separated, and in each phase, a plurality of arithmetic units executes processing for different data elements in parallel.

As a result, amongst the set of sorted data elements, the data element 13-8 comes first; the data element 13-5 second; the data element 13-4 third; the data element 13-3 fourth; the data element 13-7 fifth; the data element 13-6 sixth; the data element 13-2 seventh; and the data element 13-1 eighth. Note that the transfer of the data elements 13-1 to 13-8 may be implemented by simultaneously overwriting storage areas where the unsorted data elements 13-1 to 13-8 are stored. Alternatively, the transfer of the data elements 13-1 to 13-8 may be implemented by first storing them in storage areas different from where the unsorted data elements 13-1 to 13-8 are stored and then erasing the unsorted data elements 13-1 to 13-8 from the original storage areas.

Once the data elements 13-1 to 13-8 are sorted, the arithmetic processing device 11 selects some candidate regions amongst a plurality of candidate regions based on the sorted ordering of the data elements 13-1 to 13-8. For example, the arithmetic processing device 11 selects a predetermined number of candidate regions in descending order of the evaluation values, and passes them on to a subsequent step in the image recognition processing. The subsequent step includes duplication removal for deleting, when there is a large overlap, for example, between two candidate regions, one having a smaller evaluation value. The image recognition apparatus 10 finally selects a small number of regions, then determines the class of an object captured in each region, and outputs recognition results. For example, the image recognition apparatus 10 displays an image with the recognition results by mapping, on an original image, graphics indicating the regions and character strings indicating the classes of the objects.

According to the image recognition apparatus 10 of the first embodiment, during the course of image recognition, indexes indicating a sorted ordering of a plurality of data elements are calculated in parallel using a plurality of arithmetic units, where each of the data elements indicates the location and evaluation value of a candidate region detected from an image. Once the indexes are calculated, the data elements are simultaneously transferred using the arithmetic units, based on the calculated indexes. Then, part of the candidate regions detected from the image are selected based on the sorted ordering of the data elements.

In this manner, it is possible to sort data elements corresponding to candidate regions with the use of a GPU or other arithmetic processing device capable of parallel execution of a large number of threads. This allows speed-up of the sort operation, which entails a relatively high workload in image recognition processing, thus in turn speeding up the image recognition processing.

(b) Second Embodiment

This part of the description explains a second embodiment.

An image recognition apparatus 100 according to the second embodiment uses a neural network to implement image recognition for determining the location and class of each object in an input image. The image recognition apparatus 100 may be used for, for example, traffic and citywide surveillance systems for detecting vehicles and pedestrians on surveillance footage. The image recognition apparatus 100 may also be referred to as an information processor or computer. The image recognition apparatus 100 may be a client device or server device.

Figure 2:
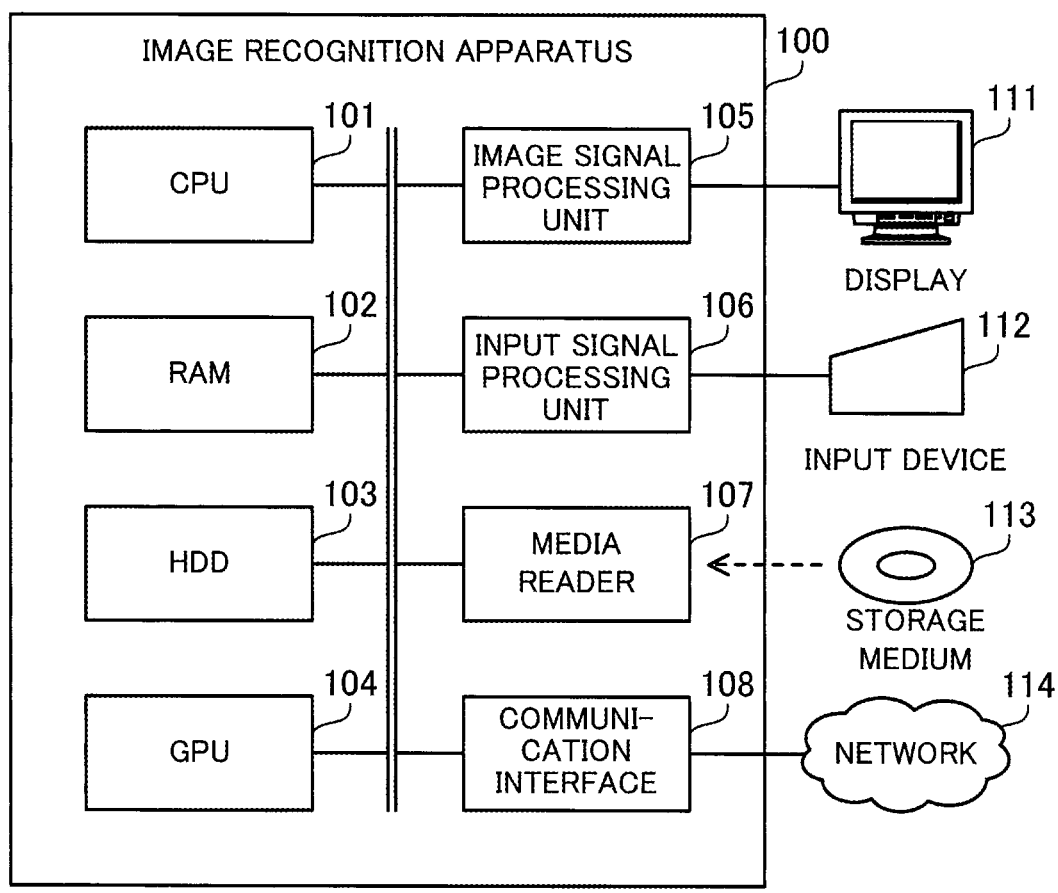
FIG. 2 is a block diagram illustrating exemplary hardware of an image recognition apparatus.

FIG. 2 is a block diagram illustrating exemplary hardware of an image recognition apparatus.

The image recognition apparatus 100 includes a CPU 101, a random access memory (RAM) 102, a hard disk drive (HDD) 103, a GPU 104, an image signal processing unit 105, an input signal processing unit 106, a media reader 107, and a communication interface 108. These units are individually connected to a bus. The image recognition apparatus 100 corresponds to the image recognition apparatus 10 of the first embodiment.

The CPU 101 is a processor configured to execute program instructions. The CPU 101 reads out at least part of programs and data stored in the HDD 103, loads them into the RAM 102, and executes the loaded programs. The RAM 102 is volatile semiconductor memory for temporarily storing therein programs to be executed by the CPU 101 and data to be used by the CPU 101 for its computation. According to a program allowing the use of the GPU 104, the CPU 101 may cause input data to be transferred from the RAM 102 to the GPU 104, then cause the GPU 104 to process the data, and cause the resultant data after processing to be transferred from the GPU 104 to the RAM 102.

The HDD 103 is a non-volatile memory device to store therein software programs, such as an operating system (OS), middleware, and application software, and various types of data. Note that the image recognition apparatus 100 may be provided with a different type of memory device, such as flash memory or a solid state drive (SSD), or may be provided with two or more memory devices.

The image signal processing unit 105 produces video images in accordance with drawing commands from the CPU 101 and displays them on a screen of a display 111 coupled to the image recognition apparatus 100. The display 111 may be any type of display, such as a cathode ray tube (CRT) display; a liquid crystal display (LCD); or an organic electro-luminescence (OEL) display.

The input signal processing unit 106 receives an input signal from an input device 112 connected to the image recognition apparatus 100. The input device 112 may be any type of input device, such as a mouse, a touch panel, a touch-pad, or a keyboard. A plurality of types of input devices may be connected to the image recognition apparatus 100.

The media reader 107 is a device for reading programs and data recorded on a storage medium 113. Examples of the storage medium 113 include a magnetic disk such as a flexible disk (FD) and an HDD, an optical disk such as a compact disc (CD) and a digital versatile disc (DVD), a magneto-optical disk (MO), and a semiconductor memory. The media reader 107 stores, for example, programs and data read from the storage medium 113 in the RAM 102 or the HDD 103.

The communication interface 108 is connected to a network 114 and communicates with different information processors via the network 114. The communication interface 108 may be a wired communication interface connected to a wired communication device, such as a switch or router, or may be a wireless communication interface connected to a base station or access point.

Figure 3:
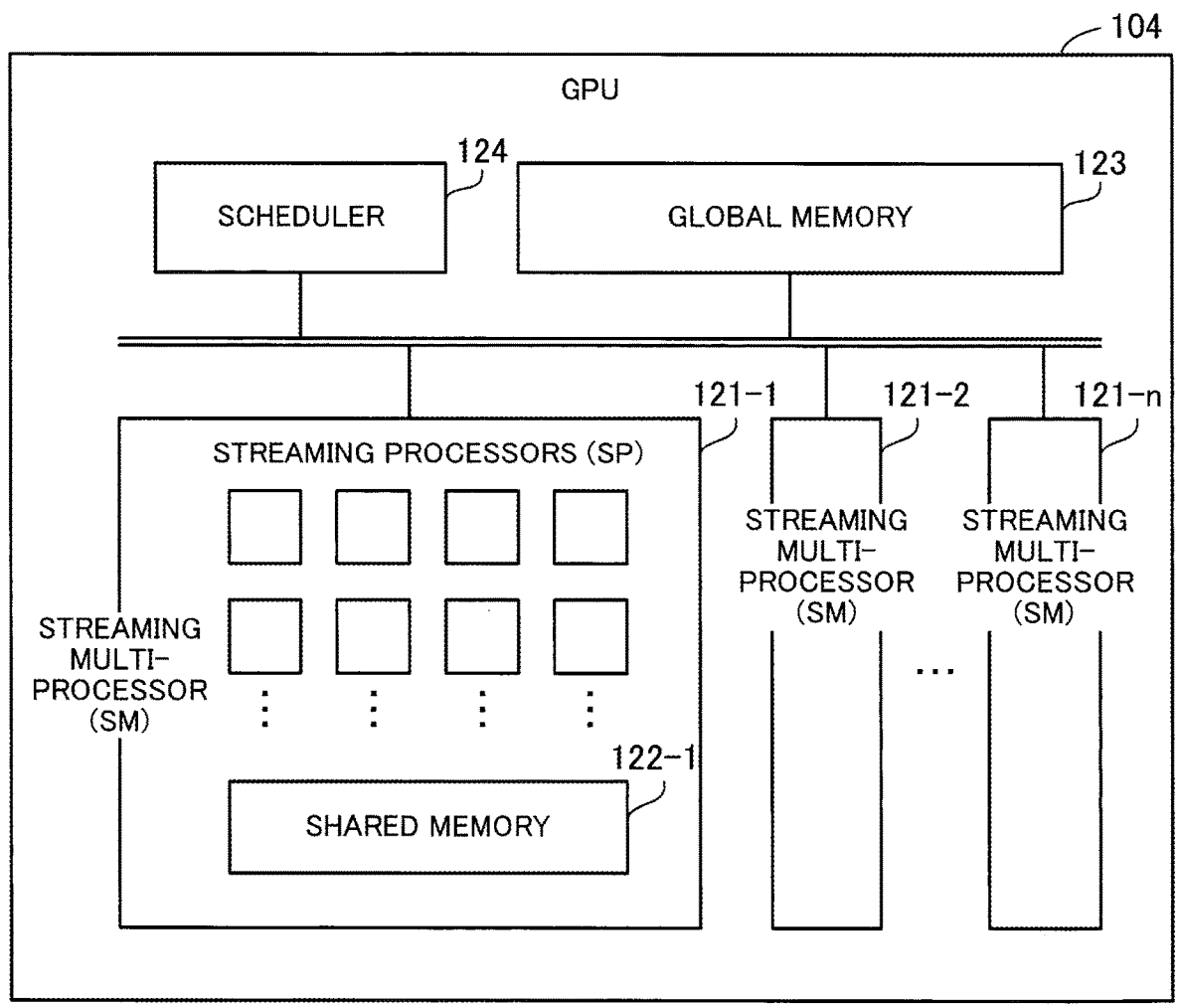
FIG. 3 is a block diagram illustrating exemplary hardware of a GPU.

FIG. 3 is a block diagram illustrating exemplary hardware of a GPU.

The GPU 104 includes a global memory 123, a scheduler 124, and a plurality of streaming multiprocessors (SMs) 121-1, 121-2, . . . , and 121-n.

The global memory 123 is volatile semiconductor memory shared by the streaming multiprocessors 121-1, 121-2, . . . , and 121-n. In accordance with commands from the CPU 101, input data is transferred from the RAM 102 to the global memory 123, and resultant data is transferred back from the global memory 123 to the RAM 102. In addition, data is read from the global memory 123 to the streaming multiprocessors 121-1, 121-2, . . . , and 121-n, and data is written out from the streaming multiprocessors 121-1, 121-2, . . . , and 121-n to the global memory 123.

The scheduler 124 schedules the execution of threads by the streaming multiprocessors 121-1, 121-2, and 121-n. The scheduler 124 divides data stored in the global memory 123 into units called blocks and then assigns one streaming multiprocessor to each block. The scheduler 124 causes each of the streaming multiprocessors 121-1, 121-2, . . . , and 121-n to read the assigned block and process it using a plurality of threads.

The streaming multiprocessor 121-1 is a multiprocessor for starting a plurality of threads and processing data of the assigned block in parallel using the threads. The streaming multiprocessor 121-1 includes a plurality of streaming processors (SPs) and shared memory 122-1. Each of the remaining streaming multiprocessors 121-2, . . . , and 121-n is implemented using the same hardware configuration.

The streaming processors are processor cores for running threads. The streaming processors of the streaming multiprocessor 121-1 read data from the shared memory 122-1, process the read data, and then write data back to the shared memory 122-1.

Assume in the second embodiment that each of the streaming multiprocessors 121-1, 121-2, . . . , and 121-n is capable of running 1024 threads in parallel. Note however that the maximum number of threads may be different, e.g. 512 or 2048. Since each streaming processor performs pipeline processing, the term "the number of threads" in this context means the number of logical threads. The number of streaming processors of the streaming multiprocessor 121-1 may thus be less than the maximum number of threads, 1024. That is, a single streaming processor may run two or more threads.

The shared memory 122-1 is volatile semiconductor memory shared by the streaming processors of the streaming multiprocessor 121-1. The shared memory 122-1 is local memory of the streaming multiprocessor 121-1 and may have less storage capacity than the global memory 123. The streaming multiprocessor 121-1 reads its assigned block from the global memory 123 into the shared memory 122-1, and writes processing results from the shared memory 122-1 into the global memory 123.

Next described is a flow of image recognition processing.

Figure 4:
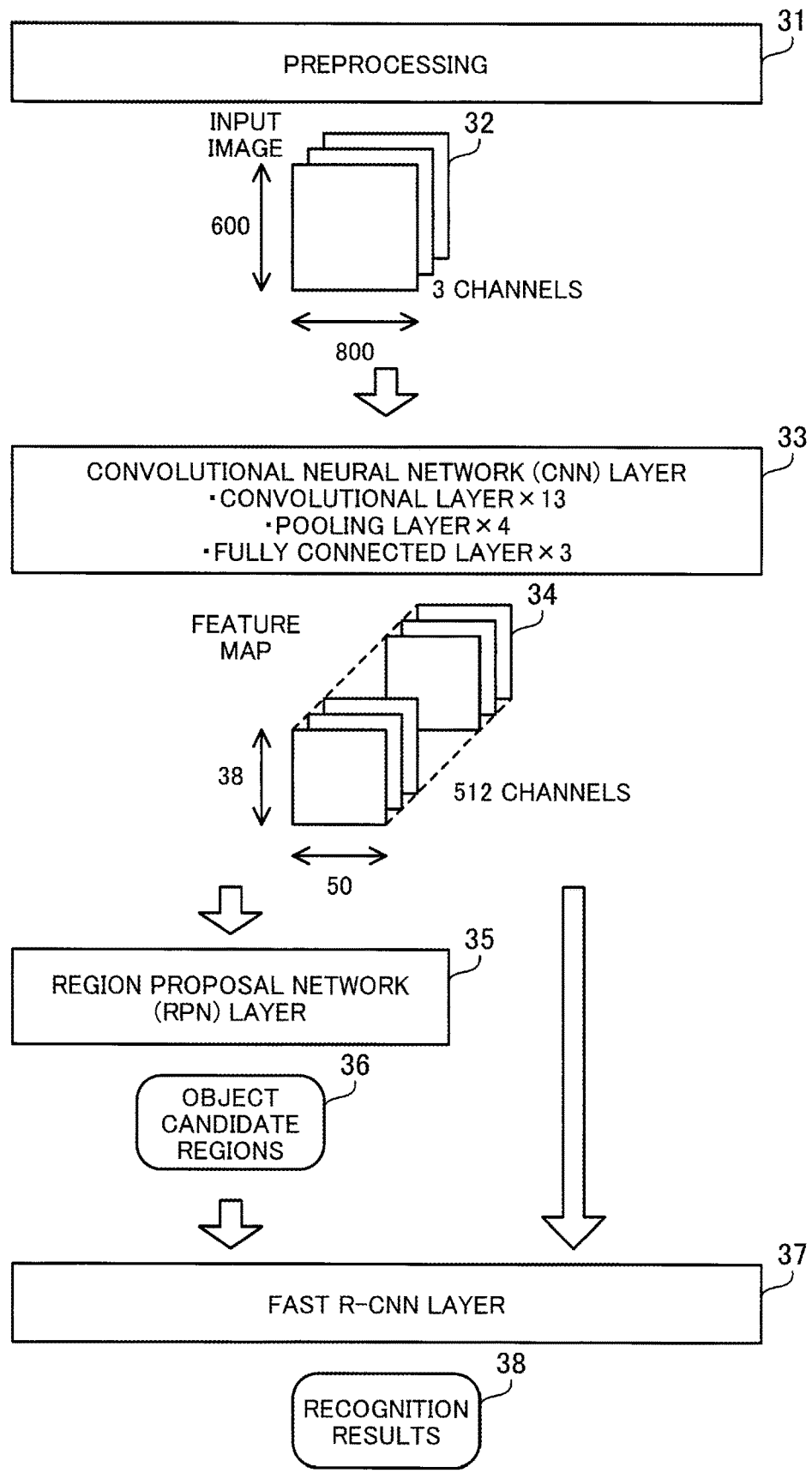
FIG. 4 illustrates an exemplary flow of image recognition processing.

FIG. 4 illustrates an exemplary flow of image recognition processing.

An image recognition model used by the image recognition apparatus 100 includes a convolutional neural network (CNN) layer 33, a region proposal network (RPN) layer 35, and a fast R-CNN layer 37. The image recognition apparatus 100 performs preprocessing 31 on an input image, and then inputs a post-preprocessing input image 32 to the CNN layer 33. The image recognition apparatus 100 inputs a feature map 34 output from the CNN layer 33 into the RPN layer 35. The image recognition apparatus 100 inputs object candidate regions 36 output from the RPN layer 35 and the aforementioned feature map 34 into the fast R-CNN layer 37. Herewith, recognition results 38 are obtained.

The preprocessing 31 adjusts the size and luminance of an input image to thereby generate the input image 32 allowed to be input to the CNN layer 33. For example, the preprocessing 31 converts an input image of size 500×375 pixels to an image of size 800×600 pixels and reduces the average luminance of the entire image. The input image 32 output from the preprocessing 31 has, for example, a size of 800 pixels in width by 600 pixels in height and is a color image having three channels of red, green, and blue (RGB).

The CNN layer 33 generates the feature map 34 from the input image 32 using a CNN with weights preliminarily obtained through training. The CNN layer 33 has a deep neural network including thirteen convolutional layers, four pooling layers, and three fully connected layers. Each convolutional layer extracts information on features, such as edges, using predetermined filters. Each pooling layer reduces image dimensions on the width and height by half. Fully connected layers aggregate outputs of the convolutional layers and pooling layers to calculate values of particular variables. The feature map 34 has, for example, a size of 50 pixels in width by 38 pixels in height and 512 channels.

Using the feature map 34, the RPN layer 35 detects, from the input image 32, the object candidate regions 36 which are image regions likely to contain objects to be detected. The RPN layer 35 sets, as object candidate regions, a large number of rectangular regions of different sizes at different locations on the input image 32, and calculates a score for each object candidate region based on the feature map 34. The score may also be referred to as an evaluation value or credibility measure. The score indicates the probability of a desired object being present in the corresponding object candidate region. The higher the score, the higher the probability of the desired object being present. The RPN layer 35 first extracts more than 6000 object candidate regions and selects the top 6000 object candidate regions in descending order of the scores. Then, the RPN layer 35 removes object candidate regions with high degree of overlapping to finally output 300 object candidate regions.

The fast R-CNN layer 37 determines, based on the feature map 34 and the object candidate regions 36, the class of an object captured in each object candidate region and calculates a score indicating the credibility measure of the determination result. The fast R-CNN layer 37 selects a small number of image regions with sufficiently high scores. The recognition results 38 output from the fast R-CNN layer 37 include, for each selected image region, the location of the image region, the determined object class, and the score indicating the probability that the object is the particular class.

The image recognition apparatus 100 is capable of displaying the recognition results 38 on a screen of the display 111 by mapping them onto the original input image. For example, the image recognition apparatus 100 converts the rectangular regions on the input image 32 into rectangular regions on the original input image before the preprocessing 31, and then displays, for each of the converted rectangular regions, a bounding box surrounding the rectangular region and a character string indicating the class of an object present therein and the score, superimposed over the original input image.

Figure 5:
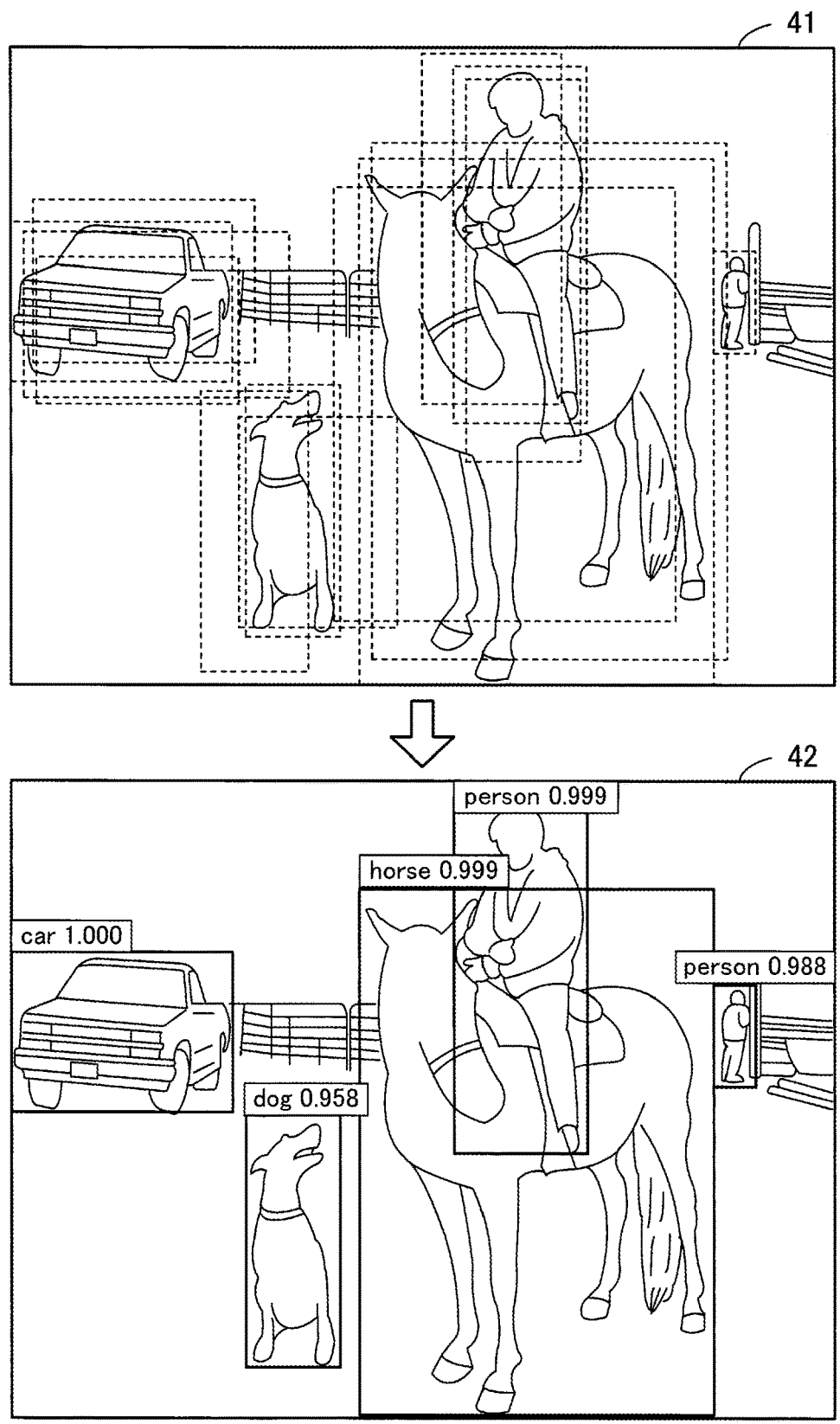
FIG. 5 illustrates an example of recognition results.

FIG. 5 illustrates an example of the recognition results.

An image 41 of FIG. 5 is a displayed image with bounding boxes indicating object candidate regions output from the RPN layer 35, superimposed over an input image. The RPN layer 35 outputs 300 object candidate regions for a single input image; however, in the example of FIG. 5, only a small number of object candidate regions are presented to facilitate understanding. The image 41 captures, as objects to be detected, a car, a dog, a horse, and two people. Note that the example of FIG. 5 omits the background, such as the ground and forests. In the image 41, not only correct object candidate regions which are rectangular regions accurately clipping objects to be detected, but also a plurality of object candidate regions of different sizes at different locations is extracted around the correct object candidate regions. In addition to these object candidate regions, a large number of object candidate regions with low scores are temporarily extracted in the RPN layer 35.

An image 42 of FIG. 5 is a displayed image with the recognition results 38 output from the fast R-CNN layer 37, superimposed over the input image. Bounding boxes in the image 42 are, amongst the bounding boxes of the object candidate regions represented in the image 41, those of some object candidate regions with high scores. A character string indicating the determined class of an object and score is displayed near each bounding box. In the example of FIG. 5, the car, dog, horse, and two people are detected correctly. The calculated score for the car is 1.000; for the dog, 0.958; for the horse, 0.999; for a person on the near side in the image 42, 0.999; and a person on the far side in the image 42, 0.988.

Next described are functions of the image recognition apparatus 100. The image recognition apparatus 100 performs a series of image recognition processing using the GPU 104 as much as possible.

Figure 6:
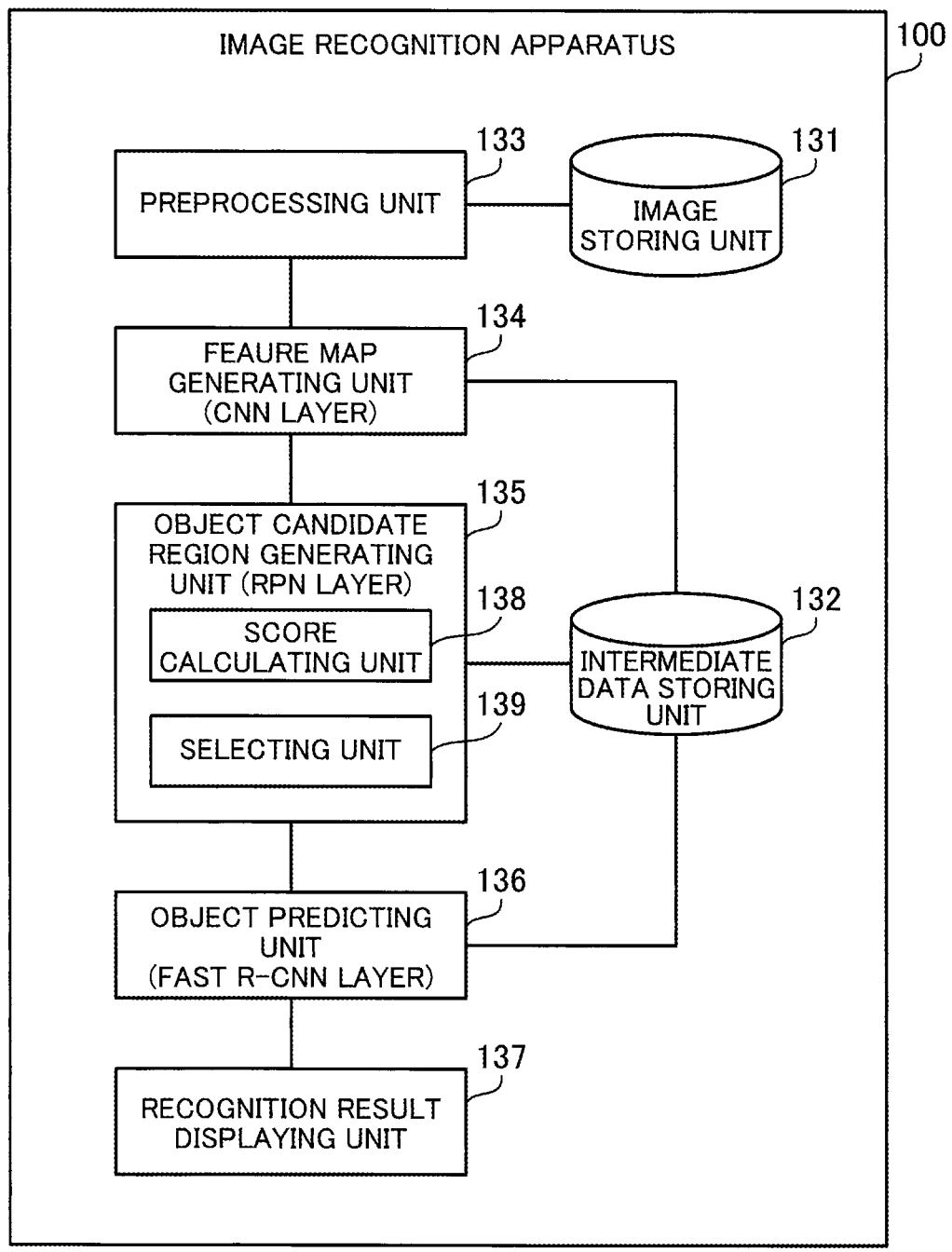
FIG. 6 is a block diagram illustrating exemplary functions of the image recognition apparatus.

FIG. 6 is a block diagram illustrating exemplary functions of an image recognition apparatus.

The image recognition apparatus 100 includes an image storing unit 131, an intermediate data storing unit 132, a preprocessing unit 133, a feature map generating unit 134, an object candidate region generating unit 135, an object predicting unit 136, and a recognition result displaying unit 137. The image storing unit 131 and the intermediate data storing unit 132 are implemented using the RAM 102 or the global memory 123 of the GPU 104. The preprocessing unit 133, the feature map generating unit 134, the object candidate region generating unit 135, the object predicting unit 136, and the recognition result displaying unit 137 are implemented through programs executed by the CPU 101 or the streaming multiprocessors 121-1, 121-2, . . . , and 121-n of the GPU 104.

The image storing unit 131 stores therein an input image. The input image may be captured by an image pickup device coupled to the image recognition apparatus 100. Alternatively, the input image may be input to the image recognition apparatus 100 by the user, or sent to the image recognition apparatus 100 from a different information processor via the network 114. The intermediate data storing unit 132 stores therein intermediate data used in the course of image recognition. The intermediate data includes score-associated location data which indicates the locations and scores of object candidate regions, as will be described later. In addition, the intermediate data includes a bitmap used to detect object candidate regions with high degree of overlapping.

The preprocessing unit 133 performs the aforementioned preprocessing 31. The preprocessing unit 133 corrects the size and luminance of the input image stored in the image storing unit 131. The feature map generating unit 134 corresponds to the aforementioned CNN layer 33. The feature map generating unit 134 inputs the preprocessed input image to a pre-trained CNN to thereby generate a feature map.

The object candidate region generating unit 135 corresponds to the aforementioned RPN layer 35. The object candidate region generating unit 135 includes a score calculating unit 138 and a selecting unit 139.

The score calculating unit 138 extracts a plurality of object candidate regions from the input image and calculates a score for each of the object candidate regions. The selecting unit 139 assembles score-associated location data composed of a plurality of elements each corresponding to one of the object candidate regions, in which each element includes the location and score of the corresponding object candidate region. The selecting unit 139 narrows down the object candidate regions. The selecting unit 139 sorts the elements of the score-associated location data in descending order of the scores, and then selects the top 6000 elements. The selecting unit 139 performs a non-maximum suppression (NMS) operation to retain one out of two or more largely overlapping object candidate regions and remove the remaining redundancy. Amongst elements remaining, the selecting unit 139 selects and outputs 300 elements in descending order of the scores.

The object predicting unit 136 corresponds to the aforementioned fast R-CNN layer 37. Based on the score-associated location data output from the object candidate region generating unit 135 and the feature map output from the feature map generating unit 134, the object predicting unit 136 determines each rectangular region with an object and the class of the object, and calculates a score indicating the credibility measure of the determination. The object predicting unit 136 narrows down the rectangular regions based on their scores, and outputs recognition results indicating, for each selected rectangular region, the location of the rectangular region, the class of an object, and the score. The recognition result displaying unit 137 displays, on a screen of the display 111, the recognition results output from the object predicting unit 136. For example, the recognition result displaying unit 137 maps the recognition results onto the input image and displays each bounding box surrounding a detected region with a character string indicating the class of an object and the score, superimposed over the input image.

Figure 7:
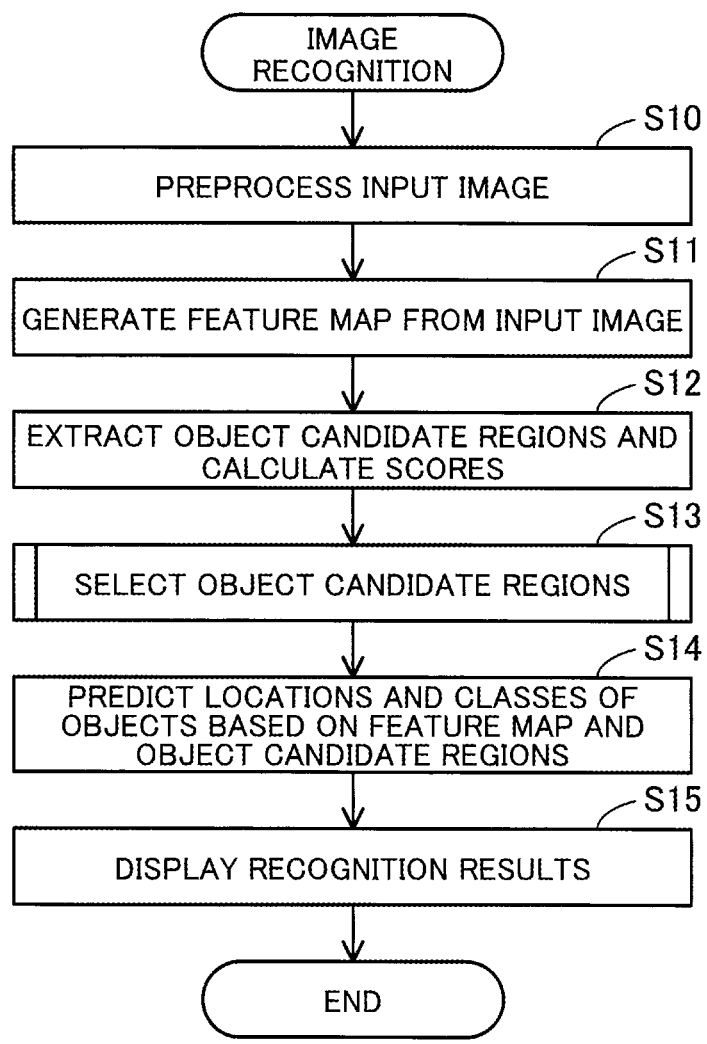
FIG. 7 is a flowchart illustrating an exemplary procedure for image recognition.

FIG. 7 is a flowchart illustrating an exemplary procedure for image recognition.

(Step S10) The preprocessing unit 133 performs preprocessing on an input image. The preprocessing includes changing the number of pixels in the width and height of the input image to be tailored to a CNN specification. In addition, the preprocessing includes an overall shift in the luminance level of each pixel of the input image so that the input image has a constant average luminance.

(Step S11) The feature map generating unit 134 inputs the input image subjected to the preprocessing in step S10 to a CNN to generate a feature map representing features of the input image. Weights of the CNN are pre-trained using sample images.

(Step S12) The score calculating unit 138 of the object candidate region generating unit 135 extracts, from the input image, object candidate regions likely to contain objects to be detected. The score calculating unit 138 uses the feature map to calculate the score of each extracted object candidate region. For example, the score calculating unit 138 places 50×38 reference points at intervals of 16 pixels on the input image. Then, the score calculating unit 138 places 9 rectangles of different sizes around each reference point as anchors to have 17100 anchors in total throughout the input image. The score calculating unit 138 obtains object candidate regions by fine-tuning the anchors based on the feature map and calculates the score for each object candidate region.

(Step S13) The selecting unit 139 of the object candidate region generating unit 135 selects 300 object candidate regions by narrowing down the object candidate regions extracted in step S12 based on the scores and the relative locations to each other. The selection of the object candidate regions is described in detail later.

(Step S14) The object predicting unit 136 predicts the location and class of each object based on the feature map generated in step S11 and the object candidate regions selected in step S13. At this time, a score indicating the credibility measure of each prediction is calculated. The location of the object corresponds to one of the selected object candidate regions.

(Step S15) The recognition result displaying unit 137 displays recognition results including the locations and classes of objects and the scores. For example, the recognition result displaying unit 137 displays, on a screen of the display 111, each bounding box indicating the location of an object with a character string indicating the class of the object and the score, superimposed over the original input image.

Figure 8:
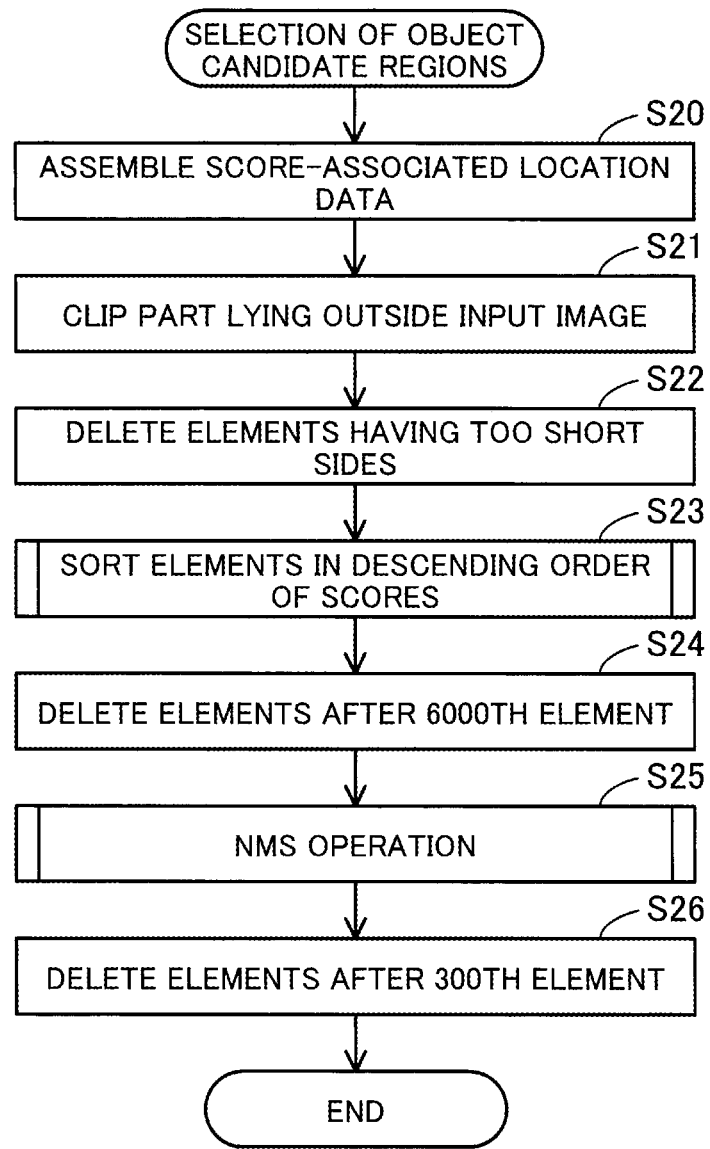
FIG. 8 is a flowchart illustrating an exemplary procedure for object candidate region selection.

FIG. 8 is a flowchart illustrating an exemplary procedure for object candidate region selection.

The object candidate region selection is performed in step S13 above.

(Step S20) The selecting unit 139 assembles score-associated location data. The score-associated location data includes a plurality of elements corresponding to the object candidate regions extracted in step S12. Each element is a dataset including the location coordinates and score of the corresponding object candidate region. At this point, the score-associated location data is not yet sorted.

(Step S21) If each object candidate region around an edge/edges of the input image contains a part lying outside the input image, the selecting unit 139 clips off the part. That is, the selecting unit 139 eliminates the part extending outside of the input image from the object candidate region. Along with the clipping, the selecting unit 139 recalculates the location coordinates of the object candidate region and then updates the score-associated location data.

(Step S22) The selecting unit 139 runs a search for object candidate regions having too short sides, and deletes elements corresponding to such object candidate regions from the score-associated location data. These object candidate regions to be deleted are narrow elongated rectangular regions and their width or height is less than or equal to a threshold. Note however that the deletion of such elements from the score-associated location data is achieved by setting, as the score of each of the elements, a predetermined value indicating that the element is invalid. As the predetermined value, for example, the minimum value of the float data type is used. This prevents the elements from being moved around within the score-associated location data for each sorting. Because steps S21 and S22 are performed independently for each element of the score-associated location data, these steps are parallelizable using the GPU 104 where one thread is assigned to each element.

(Step S23) The selecting unit 139 sorts a plurality of elements included in the score-associated location data in descending order of the scores. The sort operation is described in detail later.

(Step S24) The selecting unit 139 deletes elements after the $6000^{th}$ element from the sorted score-associated location data. Selection of the top 6000 elements is done simply by ignoring the elements after the $6000^{th}$ element. Herewith, 6000 object candidate regions with high scores are selected.

(Step S25) The selecting unit 139 performs an NMS operation on the top 6000 object candidate regions. When there is a plurality of object candidate regions having largely overlapping partial areas, the NMS operation is performed to retain a single object candidate region with the highest score and suppress the remaining lower scoring object candidate regions. These lower scoring object candidate regions are often rectangular regions slightly misaligned from the fitting rectangular region capturing an object, and are therefore deleted. The selecting unit 139 deletes elements corresponding to such object candidate regions from the score-associated location data. Note however that the deletion of such elements from the score-associated location data is achieved by setting, as the score of each of the elements, a predetermined value indicating that the element is invalid. The NMS operation is described in detail later.

(Step S26) In the case where invalid elements are included in the score-associated location data, that is, there are elements, each of whose score value indicates invalidity of the element, the selecting unit 139 performs packing to close up the storage space for each invalid element. This allows valid elements to be stored successively in descending order of the scores. The position of an element after packing is calculated based on the current position and the number of invalid elements preceding the element. Therefore, the packing is parallelizable using the GPU 104, where one thread is assigned to each element. Each thread of the GPU 104 calculates an index indicating the post-packing position of the assigned element, and the elements are simultaneously transferred after the calculation of the indexes. Then, the selecting unit 139 deletes elements after the $300^{th}$ element from the score-associated location data. Selection of the top $300^{th}$ elements is done simply by ignoring the elements after the $300^{th}$ element. In this manner, 300 object candidate regions are selected.

Next described is increasing efficiency of the sort operation in step S23.

Figure 9:
FIG. 9 illustrates exemplary sorting of score-associated location data.

FIG. 9 illustrates exemplary sorting of score-associated location data.

Score-associated location data 141 is a collection of elements corresponding to object candidate regions and stored in the intermediate data storing unit 132. The elements may also be referred to as records, entries, or unit datasets. Each element of the score-associated location data 141 includes information on the following items: score; minimum X coordinate; minimum Y coordinate; maximum X coordinate; and maximum Y coordinate. The minimum X coordinate is the X coordinate of the upper left vertex of the rectangular object candidate region. The minimum Y coordinate is the Y coordinate of the upper left vertex. The maximum X coordinate and the maximum Y coordinate are the X coordinate and the Y coordinate, respectively, of the lower right vertex. Note however that each element simply needs to allow identification of the location of its corresponding object candidate region, and the location may be defined using the minimum X and Y coordinates, the width, and the height of the object candidate region, in place of the minimum X and Y coordinates and the maximum X and Y coordinates.

The selecting unit 139 of the object candidate region generating unit 135 sorts the elements of the score-associated location data 141 in descending order of the scores. In the pre-sort score-associated location data 141, a plurality of elements is listed in an order independent of the scores. In the upper part of the example in FIG. 9, elements with scores of 0.9, 0.01, 0.02, and 0.7 are listed from top down. On the other hand, in the sorted score-associated location data 141 (the lower part of FIG. 9), the elements are rearranged in descending order of the scores such that the elements with scores of 0.9, 0.7, 0.02, and 0.01 are listed from top down.

The selecting unit 139 sorts elements of the score-associated location data using a large number of threads run in parallel by the GPU 104. A sort algorithm used here works in two stages.

Figure 10:
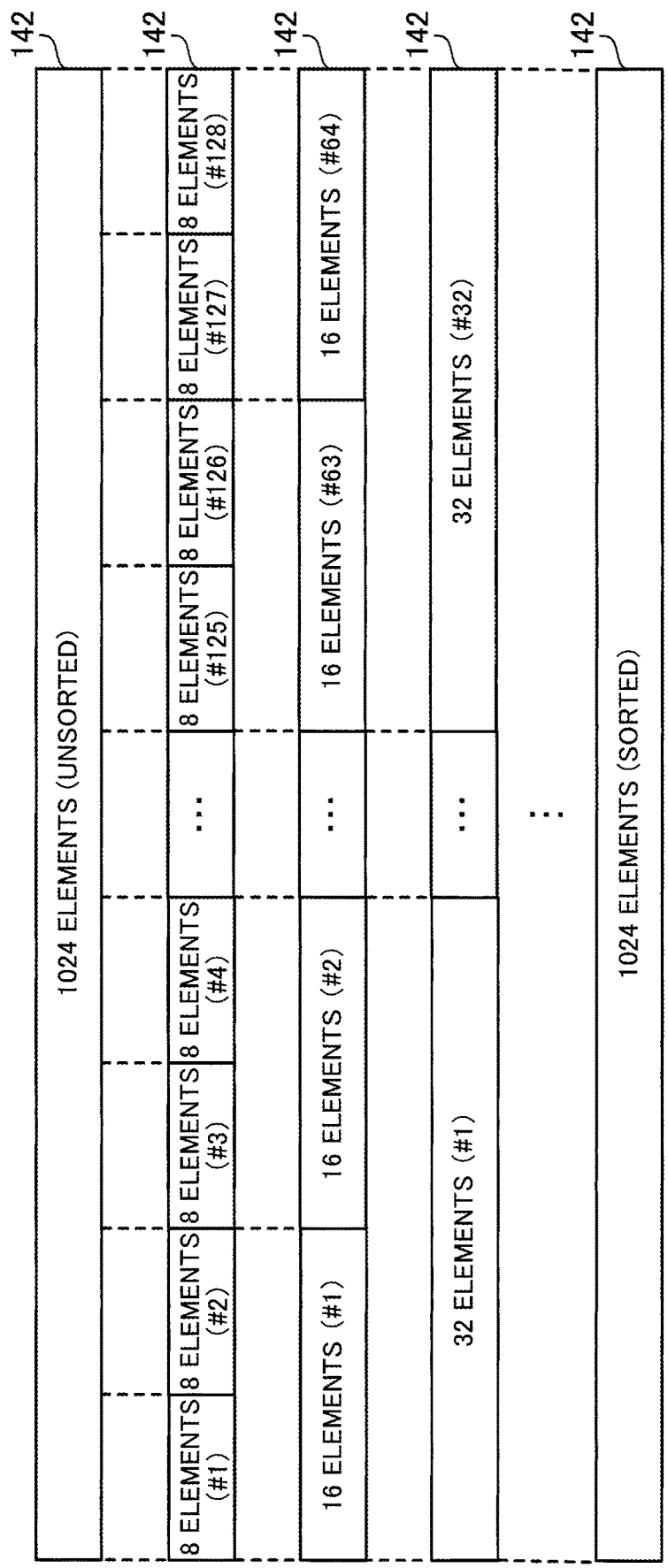
FIG. 10 illustrates exemplary first stage sorting.

FIG. 10 illustrates exemplary first stage sorting.

The selecting unit 139 divides the collection of elements in the score-associated location data into blocks. Each block includes the number of elements corresponding to the number of threads executable by a single streaming multiprocessor in parallel. Therefore, one thread is assigned to one element. In the case of the GPU 104 according to the second embodiment, each block includes 1024 elements. If the number of elements in the score-associated location data is not divisible by 1024, the selecting unit 139 adds dummy elements with a score of 0 to make each block include 1024 elements. If n is the number of elements and N is the number of blocks, then N=((n−1)/1024)+1.

In the first stage, each streaming multiprocessor sorts 1024 elements within the block. A case of sorting a block 142 using a streaming multiprocessor is described here as an example. In the first stage, the selecting unit 139 divides the block 142 into minimum groups and sorts elements within each group. Then, the selecting unit 139 repeats concatenating (merging) two adjacent sorted groups into a group until the number of elements included in the group reaches 1024.

According to the second embodiment, the number of elements in each minimum group is 8. The fewer the number of elements in each minimum group, the lower the computational effort in the first step but the larger the number of steps for concatenating two groups. On the other hand, the larger the number of elements in each minimum group, the greater the computational effort in the first step but the fewer the number of steps for concatenating two groups. The inventors of this application found that it is eminently suitable to set the number of elements in each minimum group to 8 when the block size is 1024 elements.

In view of the above, the selecting unit 139 divides the block 142 into 128 groups. Eight successive elements in the block 142 belong to each group. The selecting unit 139 simply keeps selecting eight elements sequentially from the front of the block 142. In addition, the selecting unit 139 assigns each of 1024 threads run by the same streaming multiprocessor in parallel to one of the 1024 elements included in the block 142 (i.e., one-to-one assignment between the 1024 threads and the 1024 elements). Using the 1024 threads, the selecting unit 139 sorts, in descending order of the scores, the eight elements in each of the 128 groups in parallel. This intragroup sorting is described in detail later.

Once the 8-element intragroup sorting is over, the selecting unit 139 concatenates two adjacent 8-element groups to form sixty-four 16-element groups. In each of the formed 16-element groups, the sixteen elements are sorted in descending order of the scores. The concatenation for the 128 8-element groups is performed in parallel using the aforementioned 1024 threads, as in the intragroup sorting. The intergroup sorting for concatenating every two sorted groups is described in detail later.

Once the 16-element groups are formed, the selecting unit 139 concatenates two adjacent 16-element groups to form thirty-two 32-element groups. In each of the formed 32-element groups, the thirty-two elements are sorted in descending order of the scores. The concatenation for the sixty-four 16-element groups is performed in parallel using the aforementioned 1024 threads. The selecting unit 139 repeats the above-described procedure to form a single group with sorted 1024 elements. In this manner, the block 142 is sorted by the single streaming multiprocessor.

Figure 11:
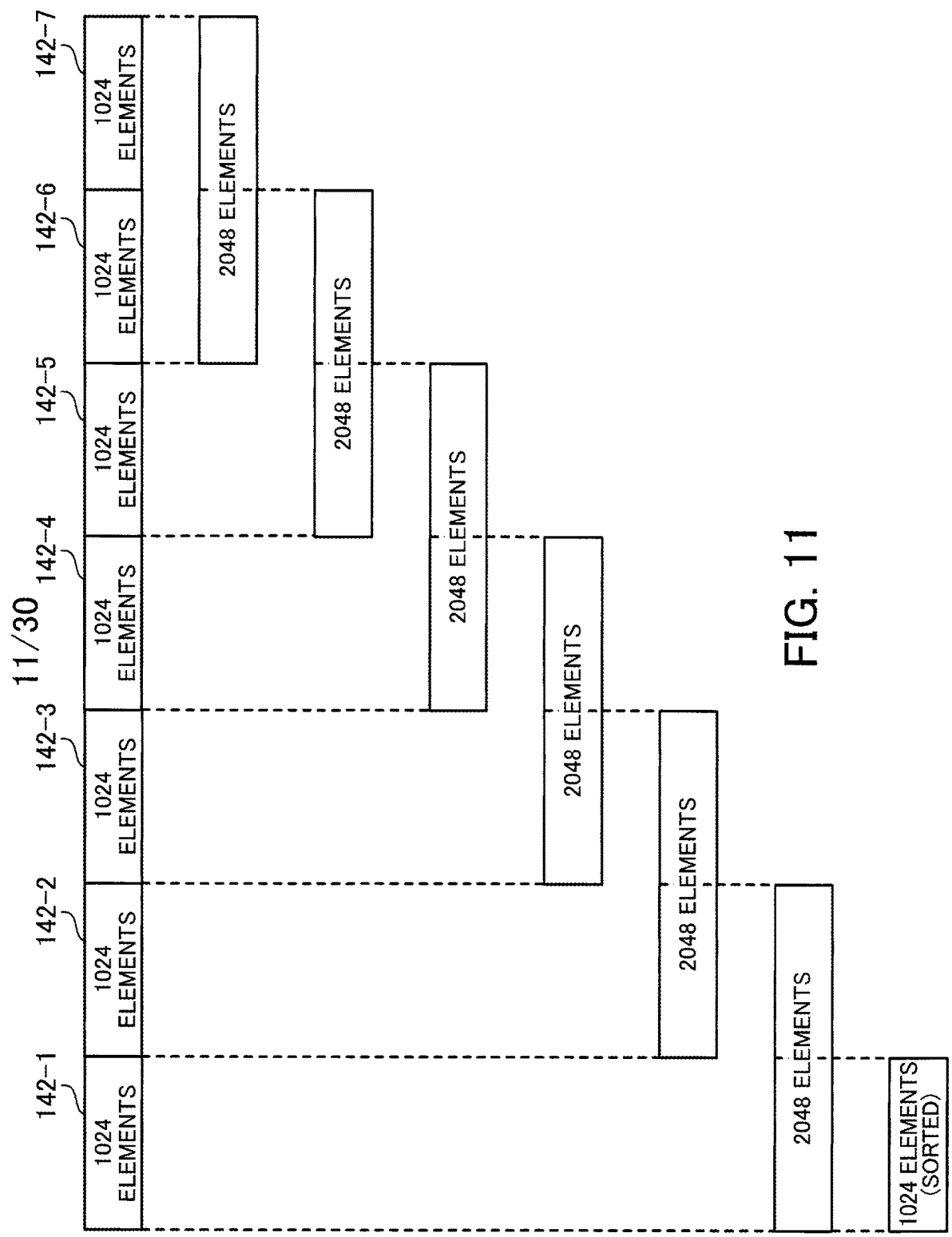
FIG. 11 illustrates exemplary second stage sorting.

FIG. 11 illustrates exemplary second stage sorting.

In the second stage sorting, one streaming multiprocessor concatenates N sorted blocks and forms a sorted element array of 6144 elements (=1024 elements×6 blocks). Because the selecting unit 139 selects top 6000 elements in a later stage of the sort operation, elements with high scores for six blocks simply need to be extracted regardless of the number of elements n. A case of concatenating sorted blocks 142-1 to 142-7 to form an element array of sorted top 6144 elements using a streaming multiprocessor is described here as an example.

In the second stage sorting, the selecting unit 139 uses bubble sort to sequentially determine elements in descending order of the scores. The selecting unit 139 concatenates two blocks to form sorted 2048 elements. Then, the selecting unit 139 retrieves the top 1024 elements from the 2048 elements and concatenates the retrieved elements with a different block to form sorted 2048 elements. This procedure is repeated until no unprocessed blocks are left, and 1024 elements with the highest scores are extracted in the end. This is repeated for the remaining element groups to determine 1024 elements in descending order of the scores in each iteration. Then, after six iterations, an element array of sorted 6144 elements is obtained.

One streaming multiprocessor is capable of running 1024 threads in parallel. Therefore, to concatenate two blocks, the selecting unit 139 makes a one-to-one assignment between the 1024 threads and 1024 elements included in one block, and separately makes a one-to-one assignment between the 1024 threads and 1024 elements included in the other block. Then, the selecting unit 139 causes the two sets of 1024 threads to be executed.

For example, the selecting unit 139 concatenates the blocks 142-6 and 142-7 to form sorted 2048 elements. The selecting unit 139 saves, amongst the 2048 elements, the lower 1024 elements as a block for later use while extracting the upper 1024 elements. The selecting unit 139 concatenates the extracted upper 1024 elements with the block 142-5 to form sorted 2048 elements. The selecting unit 139 saves, amongst the 2048 elements, the lower 1024 elements as a block for later use while extracting the upper 1024 elements. Thereafter, the blocks 142-4, 142-3, and 142-2 are sequentially and individually concatenated in a similar fashion. Then, the block 142-1 is concatenated to form 2048 elements, the upper 1024 elements of which are the 1024 elements with the highest scores.

Thus, the selecting unit 139 repeats concatenating two blocks six times with respect to the seven blocks 142-1 to 142-7 to obtain the top 1024 elements. Subsequently, the selecting unit 139 performs similar processing on the saved six blocks, in which concatenation of two blocks is repeated five times to obtain the next 1024 elements. In this manner, the selecting unit 139 determines elements with high scores equivalent to six blocks in the end.

Figure 12:
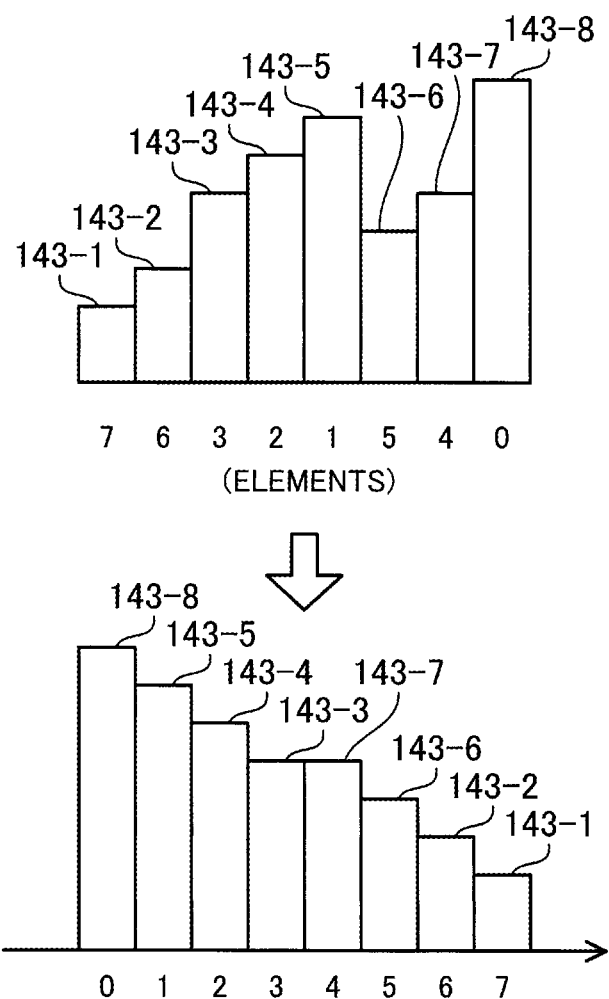
FIG. 12 illustrates exemplary intragroup sorting.

FIG. 12 illustrates exemplary intragroup sorting.

The intragroup sorting is performed in the first stage sorting to sort eight elements within the same group. Assume here that eight elements 143-1 to 143-8 are sequentially aligned in the stated order. Eight threads are assigned one-to-one to the elements 143-1 to 143-8. Each thread is able to refer to all the elements 143-1 to 143-8. The intragroup sorting works in two stages: index calculation and element transfer. Because both the index calculation and the element transfer may be implemented independently among the elements, the procedure of each stage is parallelizable.

In the index calculation, each thread compares the score of the element of which the thread is in charge (hereinafter simply referred to as the "assigned element") against the score of each of the remaining elements, and counts the number of elements having higher scores than the assigned element. In the case where there is an element having the same score as the assigned element, the thread counts the element in if it comes before the assigned element, but counts the element out if it comes behind the assigned element. Herewith, it is possible to ensure the ordering consistency between elements having the same score. The number of elements having higher scores than the assigned element is used as a post-sort index for the element. Such indexes, which are integers starting with 0, indicate positions of their corresponding assigned elements in a sorted ordering.

For example, a thread in charge of the element 143-2 determines that the elements 143-3 to 143-8 have higher scores than the element 143-2, and thus finds the index to be 6. A thread in charge of the element 143-3 determines that the elements 143-4, 143-5, and 143-8 have higher scores than the element 143-3, and thus finds the index to be 3. Note that the element 143-7 has the same score as the element 143-3; however, the thread in charge of the element 143-3 counts the element 143-7 out since the element 143-7 comes behind the element 143-3. A thread in charge of the element 143-7 determines that the elements 143-4, 143-5, and 143-8 have higher scores than the element 143-7 and the element 143-3 coming before the element 143-7 has the same score as the element 143-7, and thus finds the index to be 4. Herewith, the indexes of the elements 143-1 to 143-8 are found to be 7, 6, 3, 2, 1, 5, 4, and 0, respectively.

Once all the threads complete the index calculation, the intragroup sorting moves onto the element transfer. In the element transfer, each thread simultaneously transfers its assigned element to a storage area indicated by the index calculated earlier. Since different threads do not write to the same storage area, there is no need for one thread to stall, waiting for another thread to transfer an element. For example, because the element 143-2 is associated with an index of 6, the thread in charge of the element 143-2 overwrites the seventh storage area, in which the element 143-7 is stored, with the element 143-2. In addition, because the element 143-3 is associated with an index of 3, the thread in charge of the element 143-3 overwrites the fourth storage area, in which the element 143-4 is stored, with the element 143-3. In this manner, the elements 143-1 to 143-8 are sorted in descending order of the scores as follows: the elements 143-8, 143-5, 143-4, 143-3, 143-7, 143-6, 143-2, and 143-1.

Note that, in the element transfer, the sorted elements 143-1 to 143-8 may be stored in different storage areas, instead of overwriting the storage areas, in which the pre-sort elements 143-1 to 143-8 are stored, with the sorted elements 143-1 to 143-8.

Figure 13:
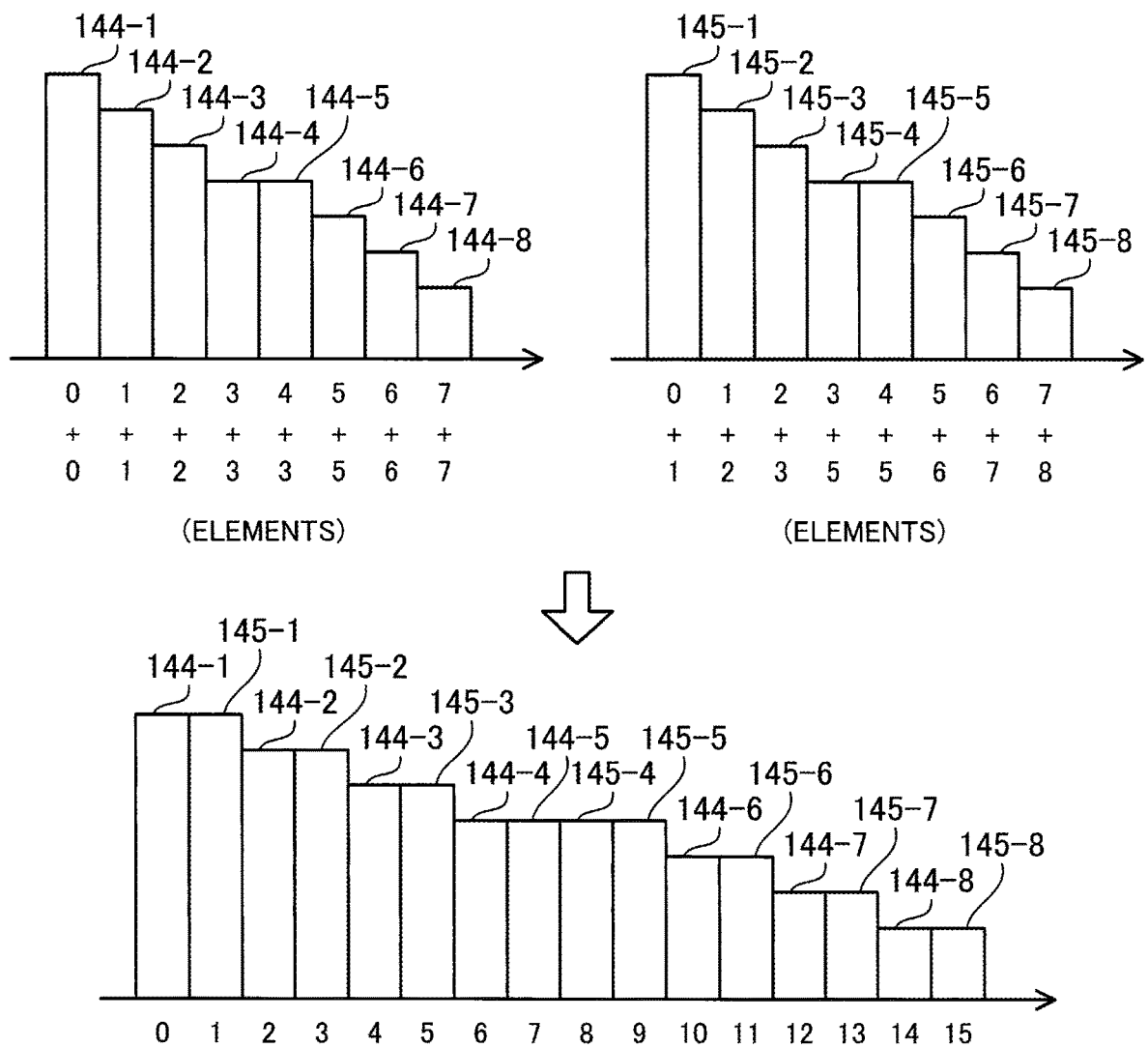
FIG. 13 illustrates exemplary intergroup sorting.

FIG. 13 illustrates exemplary intergroup sorting.

The intergroup sorting is performed when concatenating sorted groups in the first stage sorting or when concatenating sorted blocks in the second stage sorting. Let us here consider the case of concatenating a sorted 8-element group made up of elements 144-1 to 144-8 and another sorted 8-element group made up of elements 145-1 to 145-8. Sixteen threads are assigned one-to-one to the elements 144-1 to 144-8 and 145-1 to 145-8. Each thread is able to refer to all the elements 144-1 to 144-8 and 145-1 to 145-8. The intergroup sorting also works in two stages: index calculation and element transfer. Because both the index calculation and the element transfer may be implemented independently among elements, the procedure of each stage is parallelizable.

In the index calculation, each thread checks the current index associated with its assigned element (hereinafter referred to as the "own-group index") within an element set to which the assigned element belongs ("own-group dataset"). The own-group index indicates the ordering position of the assigned element within the own-group dataset. In addition, each thread calculates the number of elements having higher scores than the assigned element ("other-group index") in the other element set to be concatenated with the own-group dataset ("other-group dataset"). The other-group index indicates the ordering position of the assigned element if the assigned element is inserted into the other-group dataset. Since the other-group dataset is already sorted, there is no need to compare the score of the assigned element against that of each element in the other-group dataset. Instead, the other-group index is found by a binary search.

In the binary search, the score of the assigned element is compared to that of the median element of the other-group dataset. If the former is higher, the score of the assigned element is then compared to that of the median element of the first-half section in the other-group dataset. On the other hand, if the latter is higher, the score of the assigned element is then compared to that of the median element of the second-half section. By repeating this procedure, the insertion position for the assigned element is determined. In the case where there is an element having the same score as the assigned element, the element belonging to a particular one of the two group datasets is counted in, but the element belonging to the other group dataset is counted out. Herewith, it is possible to ensure the ordering consistency between elements having the same score. For example, if an element whose score is equal to that of the assigned element appears in the 8-element group of the elements 144-1 to 144-8, the element is counted in; however, if such an element appears in the 8-element group of the elements 145-1 to 145-8, the element is counted out.

Each thread uses the sum of the own-group index and the other-group index as an index indicating the ordering position of the assigned element after sorting associated with concatenation (hereinafter referred to as "concatenation-associated sorting"). The index indicates the number of elements having higher scores than the assigned elements within the two group datasets concatenated together. Such indexes used by the threads individually assigned to the elements of the two group datasets are integers, starting from 0. Assume, for example, that the own-group index and the other-group index of the element 144-2 are 1 and 1, respectively. Then, the index of the element 144-2 is 2, and the element 144-2 is therefore determined to come third in an ordering after the concatenation-associated sorting. Assume also that the own-group index and the other-group index of the element 145-2 are 1 and 2, respectively. Then, the index of the element 145-2 is 3, and the element 145-2 is therefore determined to come fourth in the ordering after the concatenation-associated sorting.

Once all the threads complete the index calculation, the intergroup sorting moves onto the element transfer. In the element transfer, each thread simultaneously transfers its assigned element to a storage area indicated by the index calculated earlier. Since different threads do not write to the same storage area, there is no need for one thread to stall, waiting for another thread to transfer an element. For example, because the element 144-2 is associated with an index of 2, the thread in charge of the element 144-2 overwrites the third storage area, in which the element 144-3 is stored, with the element 144-2. In addition, because the element 145-2 is associated with an index of 3, the thread in charge of the element 145-2 overwrites the fourth storage area, in which the element 144-4 is stored, with the element 145-2. In this manner, the elements 144-1 to 144-8 and 145-1 to 145-8 are sorted.

Note that, in the element transfer, the sorted elements may be stored in different storage areas instead of overwriting the storage areas, in which the pre-sort elements 144-1 to 144-8 and 145-1 to 145-8 are stored, with the sorted elements.

Figure 14:
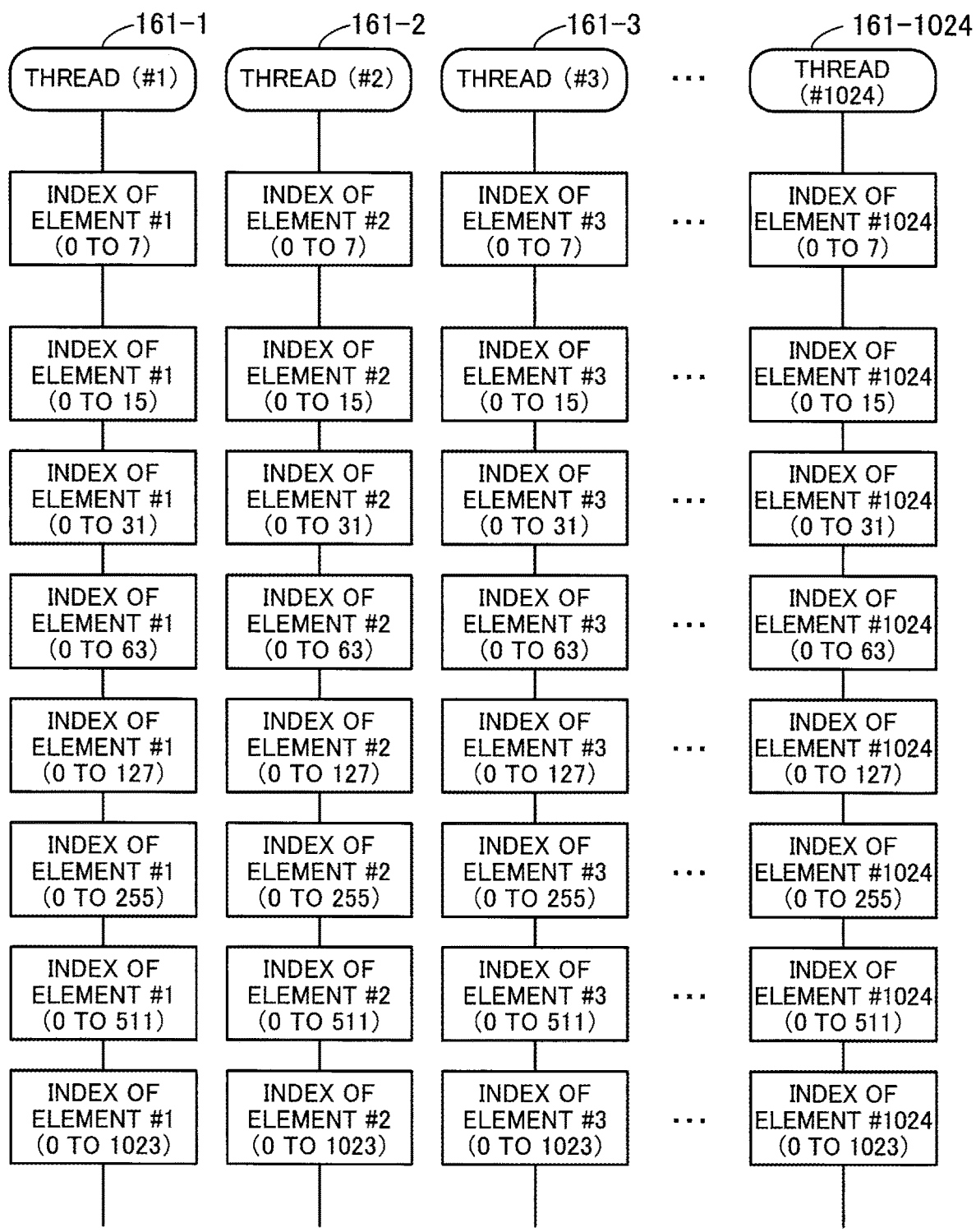
FIG. 14 illustrates exemplary thread execution in the first stage sorting.

FIG. 14 illustrates exemplary thread execution in the first stage sorting.

Let us here consider the case where the streaming multiprocessor 121-1 executes 1024 threads 161-1 to 161-1024 to thereby sort 1024 elements, Elements #1 to #1024, belonging to the same block.

First, the threads 161-1 to 161-1024 individually perform intragroup sorting of an 8-element group. The threads 161-1 to 161-1024 are actually divided into groups of eight. The thread 161-1 calculates an index of Element #1 out of Elements #1 to #8 and transfers Element #1. The thread 161-2 calculates an index of Element #2 out of Elements #1 to #8 and transfers Element #2. The thread 161-3 calculates an index of Element #3 out of Elements #1 to #8 and transfers Element #3. The thread 161-1024 calculates an index of Element #1024 out of Elements #1017 to #1024 and transfers Element #1024.

Next, the threads 161-1 to 161-1024 individually perform intergroup sorting of adjacent two 8-element groups. The threads 161-1 to 161-1024 are actually divided into groups of sixteen. The thread 161-1 calculates an index of Element #1 out of Elements #1 to #16 and transfers Element #1. The thread 161-2 calculates an index of Element #2 out of Elements #1 to #16 and transfers Element #2. The thread 161-3 calculates an index of Element #3 out of Elements #1 to #16 and transfers Element #3. The thread 161-1024 calculates an index of Element #1024 out of Elements #1009 to #1024 and transfers Element #1024.

Next, the threads 161-1 to 161-1024 individually perform intergroup sorting of adjacent two 16-element groups. The threads 161-1 to 161-1024 are actually divided into groups of thirty-two. The thread 161-1 calculates an index of Element #1 out of Elements #1 to #32 and transfers Element #1. The thread 161-2 calculates an index of Element #2 out of Elements #1 to #32 and transfers Element #2. The thread 161-3 calculates an index of Element #3 out of Elements #1 to #32 and transfers Element #3. The thread 161-1024 calculates an index of Element #1024 out of Elements #993 to #1024 and transfers Element #1024.

Then, in a like fashion, the threads 161-1 to 161-1024 individually perform intergroup sorting of adjacent two 32-element groups. The thread 161-1 calculates an index of Element #1 out of Elements #1 to #64 and transfers Element #1. Subsequently, the threads 161-1 to 161-1024 individually perform intergroup sorting of adjacent two 64-element groups. The thread 161-1 calculates an index of Element #1 out of Elements #1 to #128 and transfers Element #1. Next, the threads 161-1 to 161-1024 individually perform intergroup sorting of adjacent two 128-element groups. The thread 161-1 calculates an index of Element #1 out of Elements #1 to #256 and transfers Element #1. Next, the threads 161-1 to 161-1024 individually perform intergroup sorting of adjacent two 256-element groups. The thread 161-1 calculates an index of Element #1 out of Elements #1 to #512 and transfers Element #1. Finally, the threads 161-1 to 161-1024 individually perform intergroup sorting of adjacent two 512-element groups. The thread 161-1 calculates an index of Element #1 out of Elements #1 to #1024 and transfers Element #1.

Figure 15:
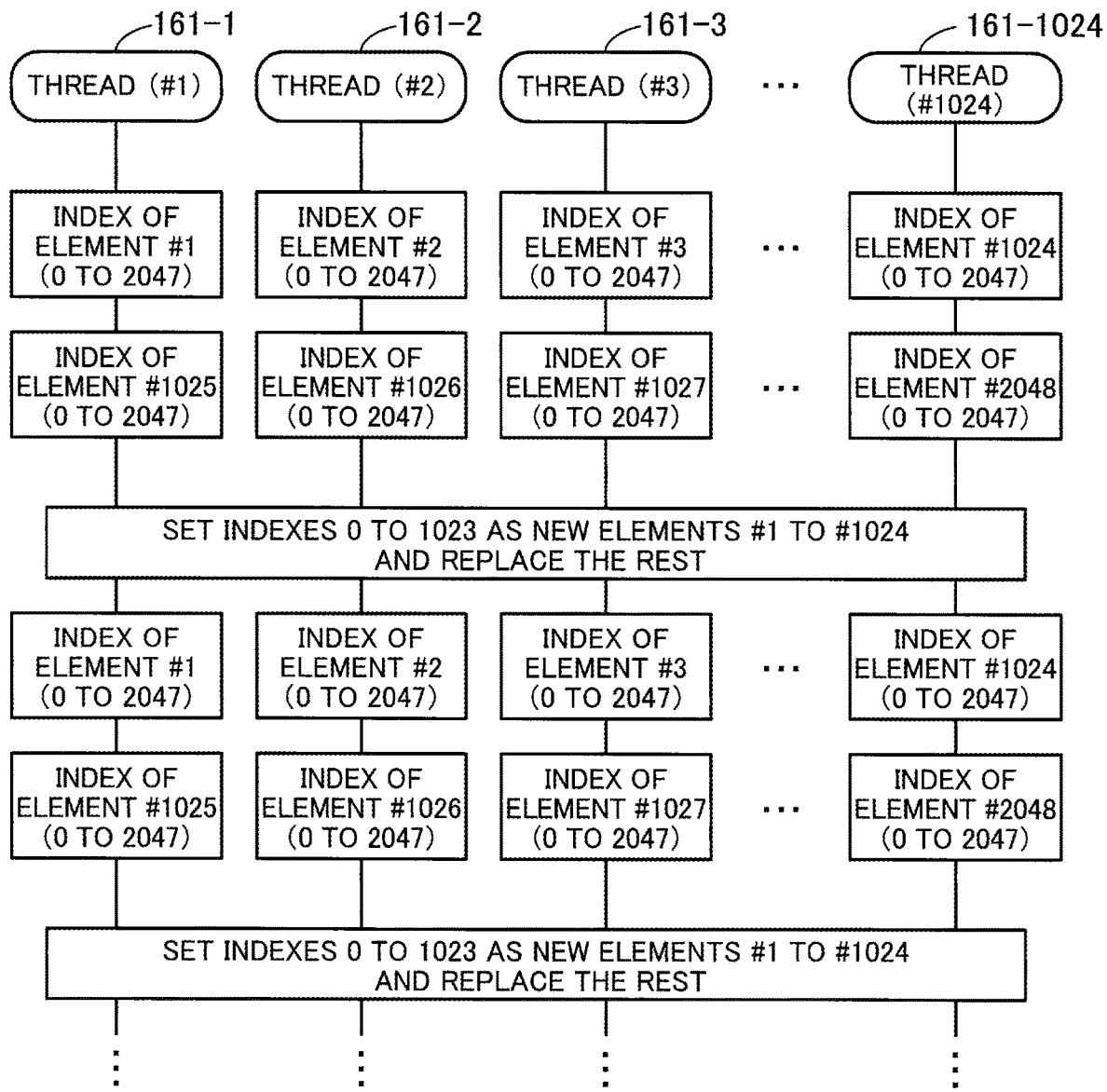
FIG. 15 illustrates exemplary thread execution in the second stage sorting.

FIG. 15 illustrates exemplary thread execution in the second stage sorting.

Let us here consider the case where the streaming multiprocessor 121-1 executes the 1024 threads 161-1 to 161-1024 to thereby repeat concatenation of two blocks and extraction of an upper block using bubble sort.

The streaming multiprocessor 121-1 loads one block as Elements #1 to #1024 and another block as Elements #1025 to #2048.

The thread 161-1 calculates an index of Element #1 out of Elements #1 to #2048. The thread 161-2 calculates an index of Element #2; the thread 161-3 calculates an index of Element #3; and the thread 161-1024 calculates an index of Element #1024. The thread 161-1 also calculates an index of Element #1025 out of Elements #1 to #2048. The thread 161-2 calculates an index of Element #1026; the thread 161-3 calculates an index of Element #1027; and the thread 161-1024 calculates an index of Element #2048.

Then, the threads 161-1 to 161-1024 simultaneously transfer Elements #1 to #2048. Herewith, Elements #1 to #2048 are sorted. The streaming multiprocessor 121-1 retains the upper 1024 elements of the sorted 2048 elements as new Elements #1 to #1024. In addition, the streaming multiprocessor 121-1 writes the remaining lower 1024 elements to the global memory 123. The block loaded as Elements #1 to #1024 is overwritten with the lower 1024 elements. Then, the streaming multiprocessor 121-1 loads a different block as Elements #1025 to #2048.

In a like fashion, the threads 161-1 to 161-1024 calculate indexes of Elements #1 to #1024 and those of Elements #1025 to #2048 out of Elements #1 to #2048, and simultaneously transfer Elements #1 to #2048. The streaming multiprocessor 121-1 retains the upper 1024 elements of the sorted 2048 elements as new Elements #1 to #1024 and writes the remaining lower 1024 elements to the global memory 123. By repeating this procedure, it is possible to eventually extract the top 1024 elements from the N blocks.

Next described is how the shared memory 122-1 is used in the second stage sorting.

Figure 16:
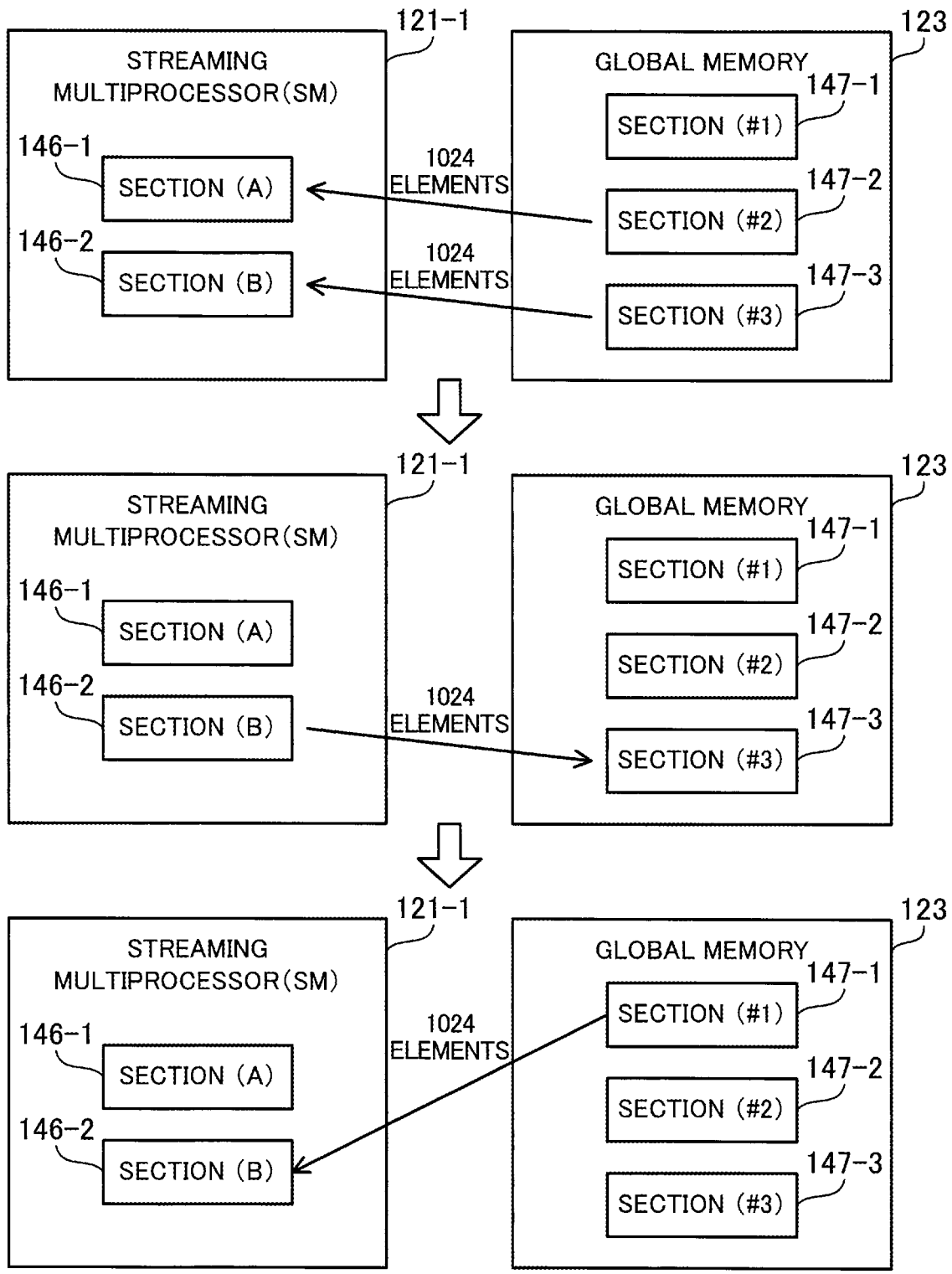
FIG. 16 illustrates exemplary memory usage in the GPU.

FIG. 16 illustrates exemplary memory usage in a GPU.

Let us here consider the case of performing the second stage sorting on three blocks for ease of explanation. In the shared memory 122-1 of the streaming multiprocessor 121-1, a section 146-1 (Section A) and a section 146-2 (Section B) are secured. In the global memory 123, sections 147-1 to 147-3 for storing three blocks are secured.

First, the streaming multiprocessor 121-1 loads a block stored in the section 147-2 into the section 146-1 and a block stored in the section 147-3 into the section 146-2. The streaming multiprocessor 121-1 performs concatenation-associated sorting on the 2048 elements stored in the sections 146-1 and 146-2. Then, the upper 1024 elements of the sorted 2048 elements are stored in the section 146-1 as a block while the remaining lower 1024 elements are stored in the section 146-2 as a block. The streaming multiprocessor 121-1 overwrites the section 147-3 with the block of the section 146-2.

Next, the streaming multiprocessor 121-1 loads a block stored in the section 147-1 into the section 146-2. The streaming multiprocessor 121-1 performs concatenation-associated sorting on the 2048 elements stored in the sections 146-1 and 146-2. Then, the upper 1024 elements of the sorted 2048 elements are stored in the section 146-1 as a block while the remaining lower 1024 elements are stored in the section 146-2 as a block.

Figure 17:
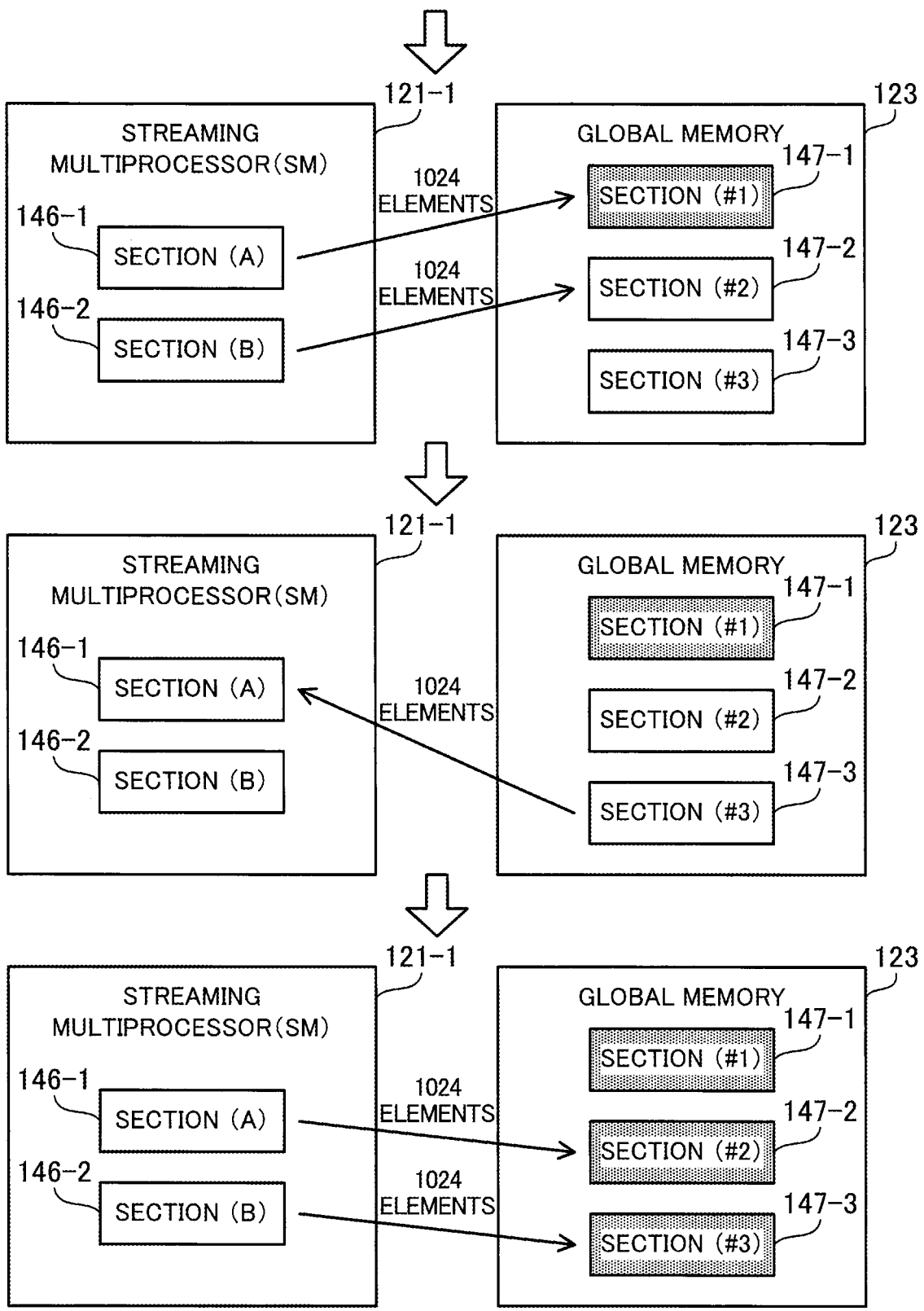
FIG. 17 illustrates the exemplary memory usage in the GPU, continuing from FIG. 16.

FIG. 17 illustrates the exemplary memory usage in the GPU, continuing from FIG. 16.

The streaming multiprocessor 121-1 overwrites the section 147-2 with the block of the section 146-2. In addition, the streaming multiprocessor 121-1 overwrites the section 147-1 with the block of the section 146-1 because the block stored in the section 146-1 is determined as the leading block in a sequence obtained as final sorting results.

Next, the streaming multiprocessor 121-1 loads a block stored in the section 147-3 into the section 146-1. A block stored in the section 147-2 is supposed to be loaded into the section 146-2; however, this procedure is omitted here because the block has already been loaded therein. The streaming multiprocessor 121-1 performs concatenation-associated sorting on the 2048 elements stored in the sections 146-1 and 146-2. Then, the upper 1024 elements of the sorted 2048 elements are stored in the section 146-1 as a block while the remaining lower 1024 elements are stored in the section 146-2 as a block.

The streaming multiprocessor 121-1 overwrites the section 147-3 with the block of the section 146-2. In addition, the streaming multiprocessor 121-1 overwrites the section 147-2 with the block of the section 146-1 because the block stored in the section 146-1 is determined as the second block in the sequence obtained as final sorting results. Herewith, sorting of the three blocks is completed, and the sorting results are stored in the sections 147-1 to 147-3.

As described above, by implementing the second stage sorting using a single streaming multiprocessor, both block loading and block writing need to be performed only once for each concatenation-associated sorting where two blocks are concatenated, with the aid of the rolling method. Thus, it is possible to reduce the frequency of block transfer between the shared memory 122-1 and the global memory 123.

Next described are properties of a sort algorithm used in the second embodiment.

Assuming that intragroup sort is performed on a group including k elements, the number of comparisons between scores is $k^2$. Assuming that intergroup sorting is performed on a concatenation of a dataset including k elements and another dataset including k elements, the number of comparisons between scores is $k \times (\log(k)+1)$. Note, however, that because the k elements are processed in parallel, the number of comparisons in the intragroup sorting and that in the intergroup sorting are actually k and $\log(k)+1$, respectively.

In addition, both in the intragroup and intergroup sorting, elements are transferred simultaneously after index calculation, thus reducing synchronization latency among threads. The intragroup sorting involves k transfers of elements but pays the thread synchronization latency only once. The same goes for the intergroup sorting.

There is another sort algorithm called selection sort, which repeatedly selects the next largest score from unsorted elements at a time. There are also algorithms called heapsort and library sort, which are improved versions of selection sort. Selection sort needs $k \times (k-1)/2$ comparisons to sort k elements and has worst-case running time of $O(k^2)$. Selection sort is difficult to parallelize.

There is yet another sort algorithm called insertion sort, which sequentially selects one element from the front of an unsorted element array at a time, and inserts the selected element, within a sorted front array part, into a proper position according to its score. There is also an algorithm called shellsort, which is an improved version of insertion sort. Insertion sort needs $k \times (k-1)/2$ comparisons and has worst-case running time of $O(k^2)$. Insertion sort is difficult to parallelize because it involves referencing the sorted front array part.

There is yet another sort algorithm called quicksort, which randomly selects one element from an unsorted element array as a pivot and puts all elements having higher scores than the pivot in front of the pivot and the remaining elements behind. Quicksort then hierarchically and recursively applies the above steps to the sub-array of elements with higher scores and separately to the sub-array of elements with lower scores, to thereby build a final sorted array. Quicksort has average running time of $O(k \times \log(k))$ and worst-case running time of $O(k^2)$. As for quicksort, it is difficult to parallelize calculation of indexes indicating transfer positions among elements.

There is yet another sort algorithm called merge sort, which divides an unsorted array into sub-arrays, sorts each sub-array recursively, and then merges every two adjacent sorted sub-arrays to finally produce a complete sorted sequence. To merge each two adjacent sorted sub-arrays, the score of the first element of one sub-array is compared to that of the other sub-array, and one having a larger score is then extracted each time. Merge sort has a worst-case performance of $O(k \times \log(k))$. Merge sort is difficult to parallelize because it involves iterations of score comparison of the first elements and element transfer.

There is yet another sort algorithm called odd-even sort, which compares all odd- and even-numbered pairs of adjacent elements in an unsorted array and swaps the elements of each pair in such a way that one having a higher score comes before the other in a sequence, and then repeats this for even- and odd-numbered pairs of adjacent elements. The odd-even sort alternates between odd/even and even/odd steps until the array is sorted. The odd-even sort is an improved version of bubble sort. Odd-even sort has worst-case running time of $O(k^2)$. Odd-even sort involves a lot of element swaps and suffers frequent latency in synchronization.

There is yet another sort algorithm called bitonic sort, which uses a predetermined sorting network to repeat comparing two elements at particular positions and switching them in such a way that one having a higher score comes before the other in a sequence. Bitonic sort has running time of O(k×log(k)). Bitonic sort involves a lot of element swaps and suffers frequent latency in synchronization.

Next described is a procedure for sorting object candidate regions.

Figure 18:
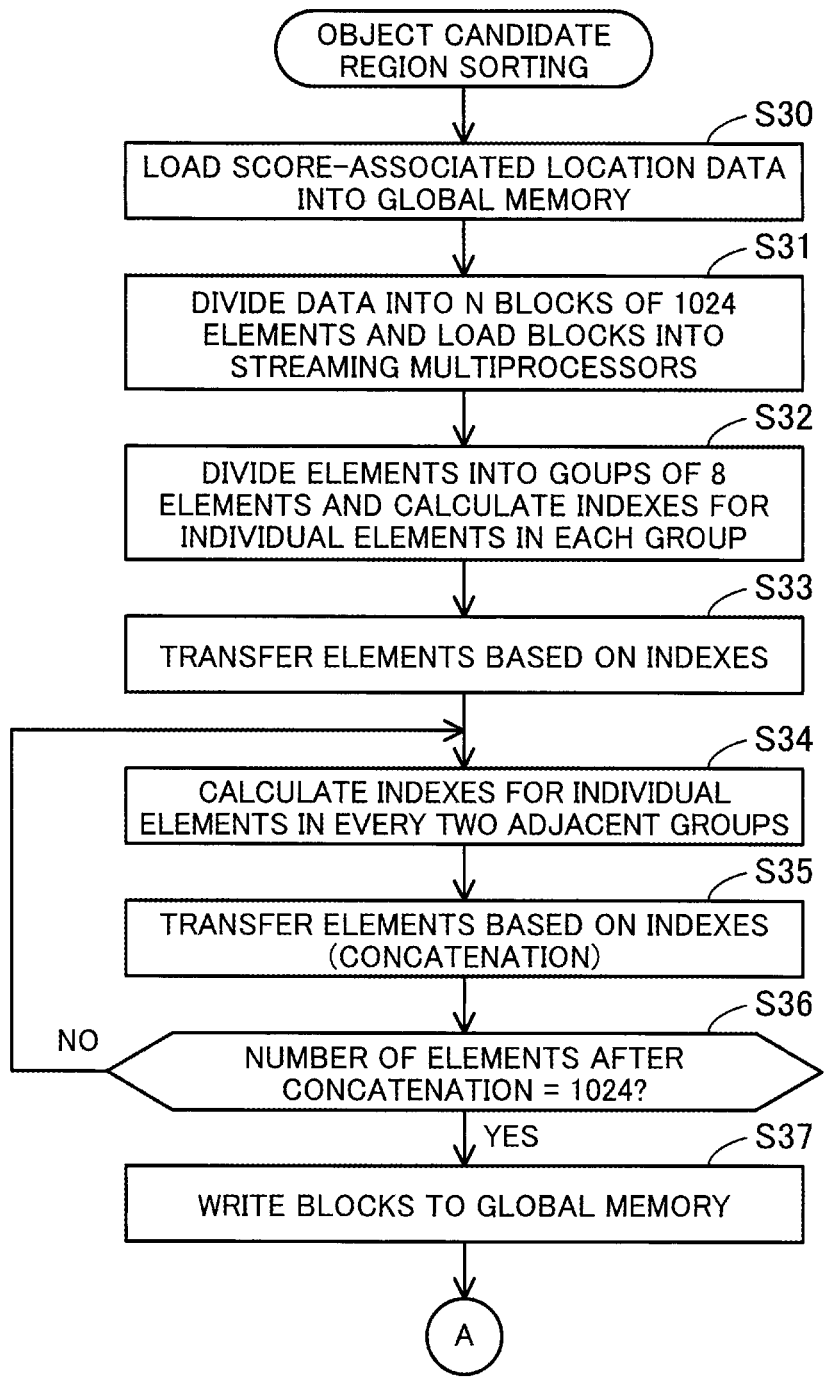
FIG. 18 is a flowchart illustrating an exemplary procedure for object candidate region sorting.

FIG. 18 is a flowchart illustrating an exemplary procedure for object candidate region sorting.

The object candidate region sorting is performed in step S23 described above.

(Step S30) The selecting unit 139 loads score-associated location data including n elements into the global memory 123 of the GPU 104. If n is not divisible by 1024, the selecting unit 139 adds dummy elements with a score of 0 to the score-associated location data.

(Step S31) The selecting unit 139 divides the score-associated location data into N blocks of 1024 elements. The selecting unit 139 selects N streaming multiprocessors and loads different blocks into different streaming multiprocessors.

(Step S32) The selecting unit 139 divides, in each streaming multiprocessor, the 1024 elements into groups of eight elements. The selecting unit 139 assigns different threads to different elements, and calculates in parallel indexes each indicating the position of a corresponding element in a sorted sequence of eight elements in each group. 1024×N threads are run in parallel by the N streaming multiprocessors, and indexes for 1024×N elements, including dummy elements, are calculated in parallel.

(Step S33) In each streaming multiprocessor, the selecting unit 139 transfers in parallel the eight elements within each group based on the indexes calculated in step S32. The 1024×N threads are run in parallel by the N streaming multiprocessors, and the 1024×N elements including dummy elements are then transferred in parallel.

(Step S34) In each streaming multiprocessor, the selecting unit 139 calculates in parallel indexes each indicating the position of a corresponding element in a sorted sequence obtained after concatenation-associated sorting of every two adjacent groups. The 1024×N threads are run in parallel by the N streaming multiprocessors, and indexes for the 1024×N elements, including dummy elements, are calculated in parallel.

(Step S35) In each streaming multiprocessor, the selecting unit 139 transfers in parallel the elements within the two adjacent groups based on the indexes calculated in step S34. The 1024×N threads are run in parallel by the N streaming multiprocessors, and the 1024×N elements including dummy elements are then transferred in parallel.

(Step S36) The selecting unit 139 determines whether the number of elements in each group after concatenation has reached 1024, that is, whether the intra-block sorting is completed. If the number of elements has reached 1024, the selecting unit 139 moves to step S37. If not, the selecting unit 139 moves to step S34.

(Step S37) The selecting unit 139 writes the sorted blocks from the N streaming multiprocessors to the global memory 123.

Figure 19:
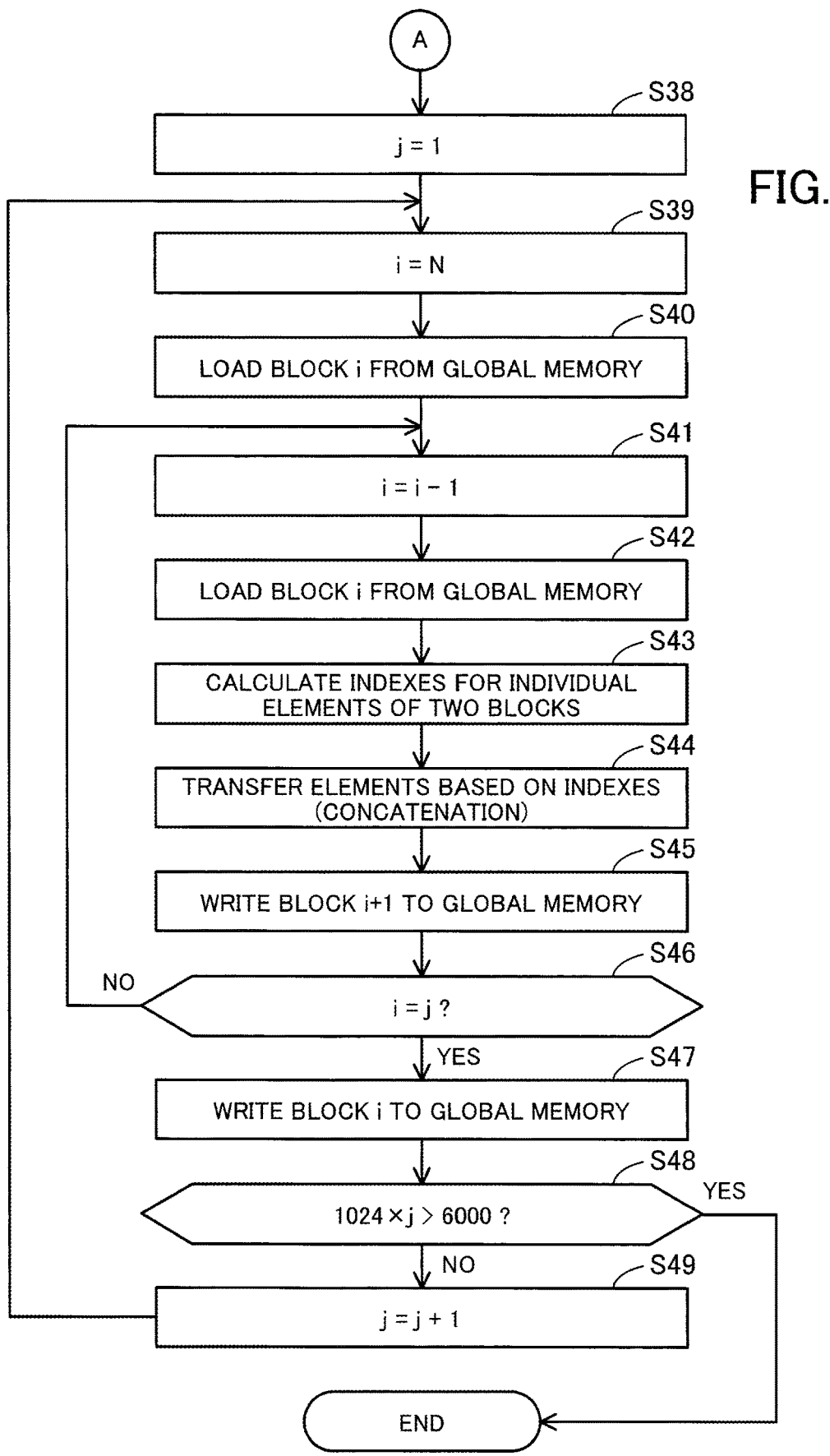
FIG. 19 is a flowchart illustrating the exemplary procedure for object candidate region sorting, continuing from FIG. 18.

FIG. 19 is a flowchart illustrating the exemplary procedure for object candidate region sorting, continuing from FIG. 18.

(Step S38) The selecting unit 139 selects one streaming multiprocessor of the GPU 104. Assume here that the selecting unit 139 selects the streaming multiprocessor 121-1. The selecting unit 139 initializes a variable j to 1 (j=1).

(Step S39) The selecting unit 139 initializes a variable i to N (i=N).

(Step S40) The selecting unit 139 loads a block i into the streaming multiprocessor 121-1 from the global memory 123. The block i is a block stored in the $i^{th}$ storage area from the front amongst N successive storage areas.

(Step S41) The selecting unit 139 updates the variable i to a new value of i−1 (i=i−1).

(Step S42) The selecting unit 139 loads the block i from the global memory 123 into the streaming multiprocessor 121-1.

(Step S43) The selecting unit 139 calculates in parallel indexes each indicating the position of a corresponding element in a sorted sequence obtained after concatenation-associated sorting of the blocks i and i+1 loaded into the streaming multiprocessor 121-1. By the streaming multiprocessor 121-1, the 1024 threads are run in parallel, and 2 sets of 1024 indexes are calculated for the 1024×2 elements.

(Step S44) In the streaming multiprocessor 121-1, the selecting unit 139 transfers in parallel elements within the two blocks based on the indexes calculated in step S43.

(Step S45) The selecting unit 139 extracts the lower 1024 elements amongst the sorted 2048 elements and writes them from the streaming multiprocessor 121-1 to the global memory 123 as the block i+1. For example, the $(i+1)^{th}$ storage area from the front amongst the N successive storage areas is overwritten with the extracted lower 1024 elements. In addition, the selecting unit 139 causes the streaming multiprocessor 121-1 to retain, as the block i, the upper 1024 elements amongst the sorted 2048 elements.

(Step S46) The selecting unit 139 compares the values of the variables i and j and determines whether i=j. If i=j, the selecting unit 139 moves to step S47. If i≠j, the selecting unit 139 moves to step S41.

(Step S47) The selecting unit 139 writes the block i retained by the streaming multiprocessor 121-1 to the global memory 123. For example, the $i^{th}$ storage area from the front amongst the N successive storage areas is overwritten with the 1024 elements.

(Step S48) The selecting unit 139 determines whether the total number of elements in the sorted blocks has exceeded 6000, that is, whether 1024×j>6000. If the inequality is true, the object candidate region sorting ends. If the inequality is not true, the selecting unit 139 moves to step S49.

(Step S49) The selecting unit 139 updates the variable j to a new value of j+1 (j=j+1). Herewith, the sort range is reduced by one block. Then, the selecting unit 139 moves to step S39.

Thus, the second stage sorting uses a single streaming multiprocessor to sort elements of N blocks using bubble sort. Note however that the second stage sorting may be implemented by different methods. Next described are modifications of the second stage sorting.

Figure 20:
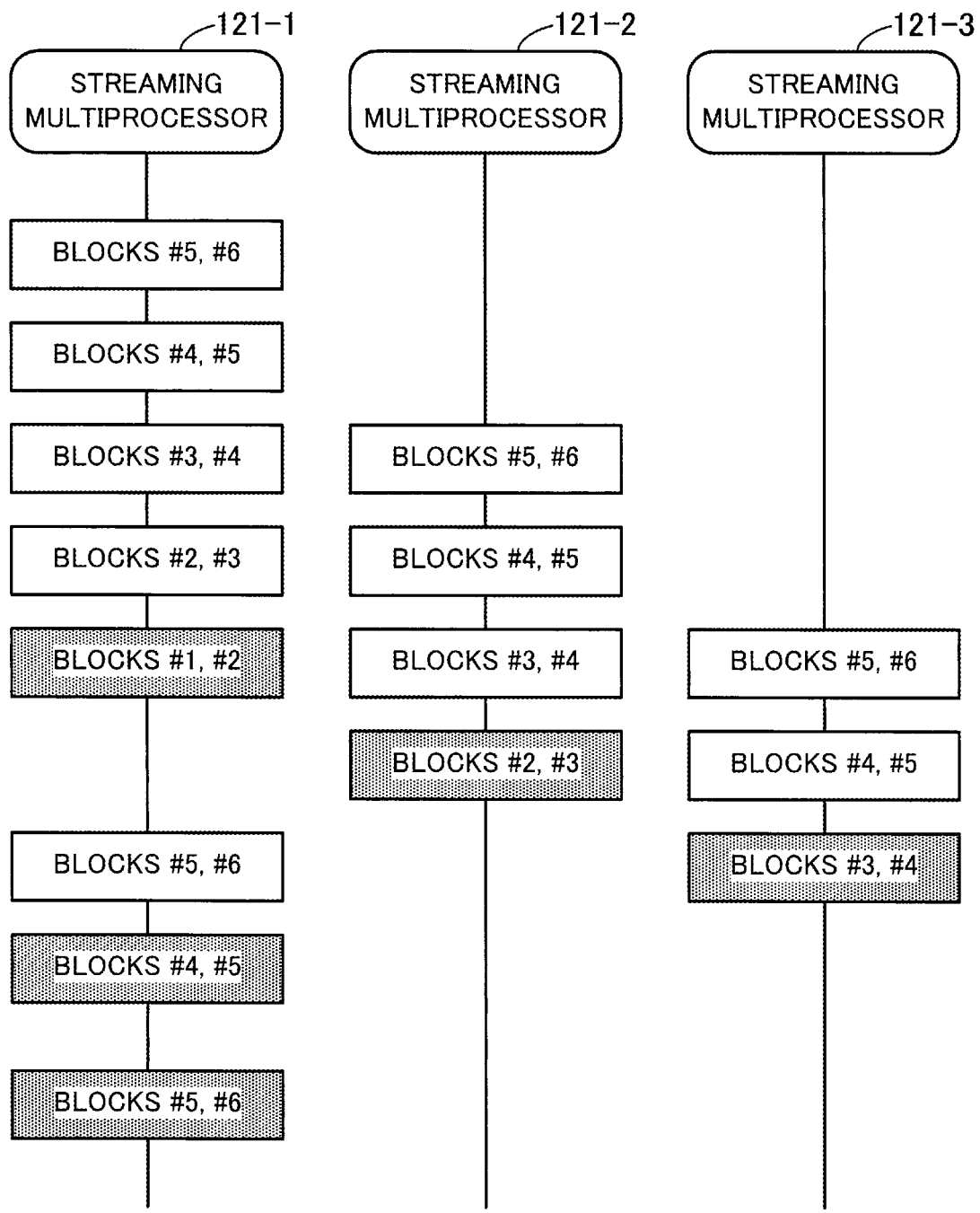
FIG. 20 illustrates a first modification of the second stage sorting.

FIG. 20 illustrates a first modification of the second stage sorting.

In the second stage sorting described above, Block #1 is determined after the first pass, on which elements with higher scores are picked up along an element array from Block #N to Block #1. Subsequently, Block #2 is determined after the second pass, on which elements with higher scores are picked up along an element array from Block #N to Block #2. On the other hand, the first modification allows different passes to be partially concurrently carried out using a plurality of streaming multiprocessors. That is, the second pass starts its scan with blocks through which the first pass has gotten, without waiting for the completion of the first pass.

Assume, for example, that the second stage sorting is performed on six blocks, Blocks #1 to #6. The streaming multiprocessor 121-1 performs concatenation-associated sorting on Blocks #5 and #6, then Blocks #4 and #5, and then Blocks #3 and #4. Because an update of Blocks #5 and #6 by the streaming multiprocessor 121-1 is already over when the concatenation-associated sorting of Blocks #3 and #4 begins, the streaming multiprocessor 121-2 performs concatenation-associated sorting on Blocks #5 and #6. The streaming multiprocessor 121-1 performs concatenation-associated sorting on Blocks #2 and #3, and at the same time, the streaming multiprocessor 121-2 performs concatenation-associated sorting on Blocks #4 and #5.

The streaming multiprocessor 121-1 performs concatenation-associated sorting on Blocks #1 and #2. Herewith, a sorted Block #1 is obtained. In parallel with this, the streaming multiprocessor 121-2 performs concatenation-associated sorting on Blocks #3 and #4. In addition, because an update of Blocks #5 and #6 by the streaming multiprocessor 121-2 is already over when the concatenation-associated sorting of Blocks #3 and #4 begins, the streaming multiprocessor 121-3 performs concatenation-associated sorting on Blocks #5 and #6.

The streaming multiprocessor 121-2 performs concatenation-associated sorting on Blocks #2 and #3. Herewith, a sorted Block #2 is obtained. In parallel with this, the streaming multiprocessor 121-3 performs concatenation-associated sorting on Blocks #4 and #5. Subsequently, the streaming multiprocessor 121-3 performs concatenation-associated sorting on Blocks #3 and #4. Herewith, a sorted Block #3 is obtained. In parallel with this, the streaming multiprocessor 121-1 performs concatenation-associated sorting on Blocks #5 and #6.

Then, the streaming multiprocessor 121-1 performs concatenation-associated sorting on Blocks #4 and #5. Herewith, a sorted Block #4 is obtained. The streaming multiprocessor 121-1 performs concatenation-associated sorting on Blocks #5 and #6. Herewith, a sorted Block #6 is obtained, and the sorting of Blocks #1 to #6 is completed.

Note that three streaming multiprocessors are used in the example of FIG. 20; however, the number of streaming multiprocessors used may be increased according to the number of blocks N such that the maximum degree of parallelism is achieved. Alternatively, to simplify the parallel control, the number of streaming multiprocessors used may be limited to a predetermined number, such as two.

Figure 21:
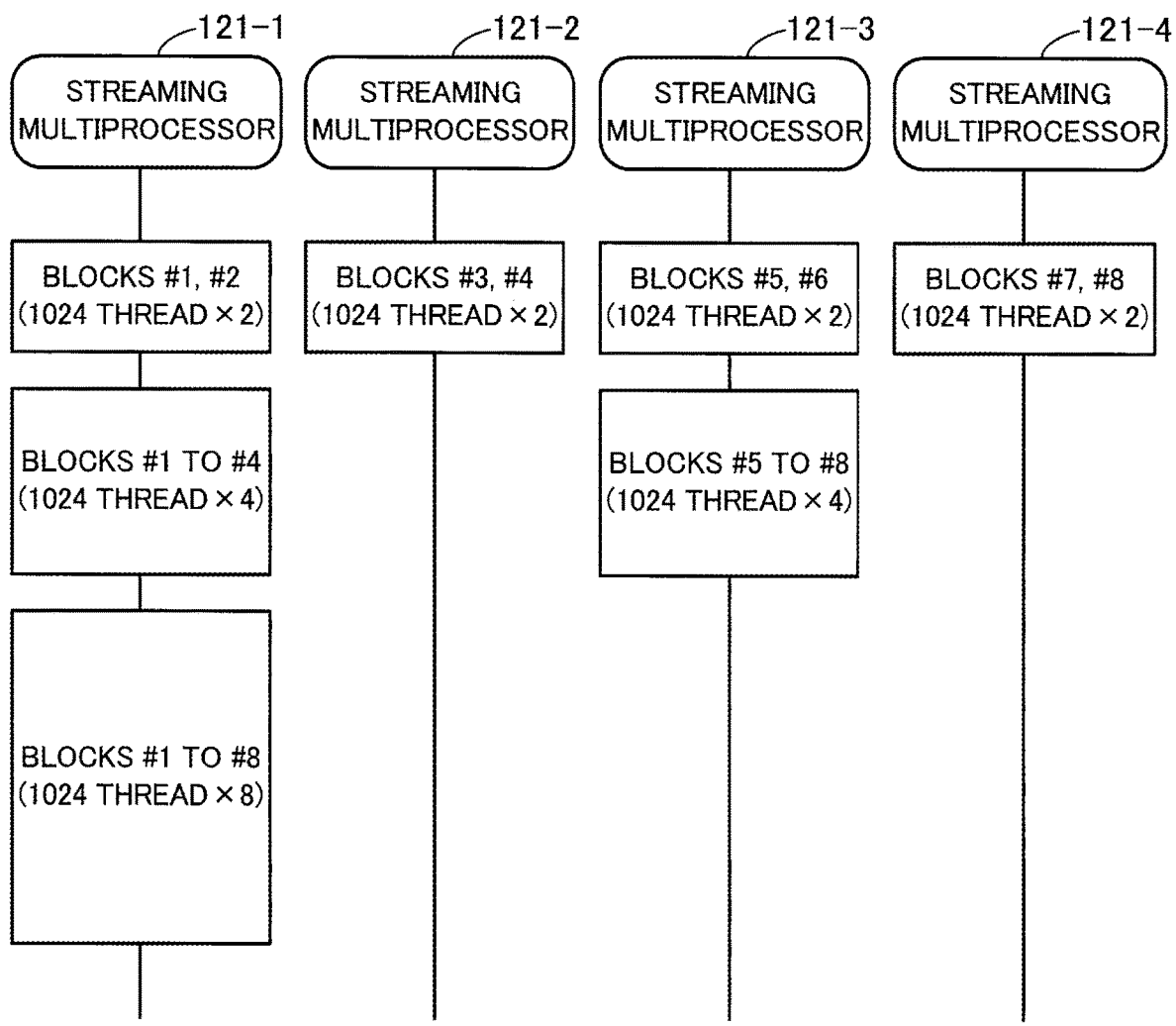
FIG. 21 illustrates a second modification of the second stage sorting.

FIG. 21 illustrates a second modification of the second stage sorting.

The second-stage storing of the second modification is directed to increasing the degree of parallelism using a large number of streaming multiprocessors, as in the case of the first stage sorting. The second stage sorting of the second modification concatenates two adjacent blocks repeatedly in a tree structure. For this purpose, the number of blocks is a power of two. If the number of blocks is not a power of two, dummy blocks with scores being all 0 are added to make up the deficiency.

Assume, for example, that the second stage sorting is performed on eight blocks, Blocks #1 to #8. The streaming multiprocessor 121-1 performs concatenation-associated sorting on Blocks #1 and #2 by running two sets of 1024 threads. In parallel with this, the streaming multiprocessor 121-2 performs concatenation-associated sorting on Blocks #3 and #4 by running two sets of 1024 threads. In parallel with this, the streaming multiprocessor 121-3 performs concatenation-associated sorting on Blocks #5 and #6 by running two sets of 1024 threads. In parallel with this, the streaming multiprocessor 121-4 performs concatenation-associated sorting on Blocks #7 and #8 by running two sets of 1024 threads.

After individual sorting of two adjacent blocks is done, the streaming multiprocessor 121-1 performs concatenation-associated sorting on Blocks #1 to #4 by running four sets of 1024 threads. Because each of the set of Blocks #1 and #2 and the set of Blocks #3 and #4 has already been sorted, these sets are treated as two adjacent datasets in the sort operation. In parallel with this, the streaming multiprocessor 121-3 performs concatenation-associated sorting on Blocks #5 to #8 by running four sets of 1024 threads. Because each of the set of Blocks #5 and #6 and the set of Blocks #7 and #8 has already been sorted, these sets are treated as two adjacent datasets in the sort operation.

After individual sorting of four adjacent blocks is done, the streaming multiprocessor 121-1 performs concatenation-associated sorting on Blocks #1 to #8 by running eight sets of 1024 threads. Because each of the set of Blocks #1 to #4 and the set of Blocks #5 to #8 has already been sorted, these sets are treated as two adjacent datasets in the sort operation.

According to the original second stage sorting described above, a single streaming multiprocessor runs 1024 threads 54 times ($=2\times(7+6+5+4+3+2)$) to obtain top six sorted blocks from among eight blocks. On the other hand, according to the second stage sorting of the second modification, first, four streaming multiprocessors individually run 1024 threads twice. Subsequently, two streaming multiprocessors individually run 1024 threads four times. Then, a single streaming multiprocessor runs 1024 threads eight times. Therefore, the number of substantial runs is 14, and it is thus possible to reduce the thread runtime.

Note however that the second stage sorting of the second modification involves an increased amount of block transfer between the global memory 123 and the shared memory of each streaming multiprocessor. In view of this, the second stage sorting of the second modification makes arrangements such that a reduction in the total thread runtime due to an increased degree of parallelism exceeds an increase in memory access time, to thereby achieve speed-up of the overall sort operation.

Next described is increasing efficiency of the NMS operation in step S25.

Figure 22:
FIG. 22 illustrates an exemplary NMS operation on score-associated location data.

FIG. 22 illustrates an exemplary NMS operation on score-associated location data.

A score-associated location data 151 is a collection of elements indicating object candidate regions, which are sorted in descending order of the scores. The selecting unit 139 of the object candidate region generating unit 135 deletes part of elements from the score-associated location data 151 by the NMS operation. Elements to be deleted are those corresponding to, amongst object candidate regions with low scores, those each having a high proportion of overlap with an object candidate region with a high score. Intersection over Union (IoU) may be used as an index of the region overlap rate. IoU between object candidate regions A and B is defined as: $IoU=(A\cap B)/(A\cup B)$, and indicates the ratio of the overlapping area between the object candidate regions A and B to the sum of the areas of the two regions. IoU is closer to 1 when there is a higher degree of region overlap while IoU is closer to 0 when there is a lower degree of region overlap. When IoU of the object candidate regions A and B exceeds a threshold (e.g. 0.7), the selecting unit 139 deletes, of the object candidate regions A and B, one with a lower score.

In the example of FIG. 22, because an object candidate region with a score of 0.99 and another object candidate region with a score of 0.07 have a high region overlap rate, the element with a score of 0.07 is deleted from the score-associated location data 151. In addition, because an object candidate region with a score of 0.97 and another object candidate region with a score of 0.05 have a high region overlap rate, the element with a score of 0.05 is deleted from the score-associated location data 151. Further, because an object candidate region with a score of 0.95 and another object candidate region with a score of 0.02 have a high region overlap rate, the element with a score of 0.02 is deleted from the score-associated location data 151. Still further, an object candidate region with a score of 0.94 and another object candidate region with a score of 0.01 have a high region overlap rate, the element with a score of 0.01 is deleted from the score-associated location data 151.

Next described is a procedure for a non-parallelized NMS operation.

Figure 23:
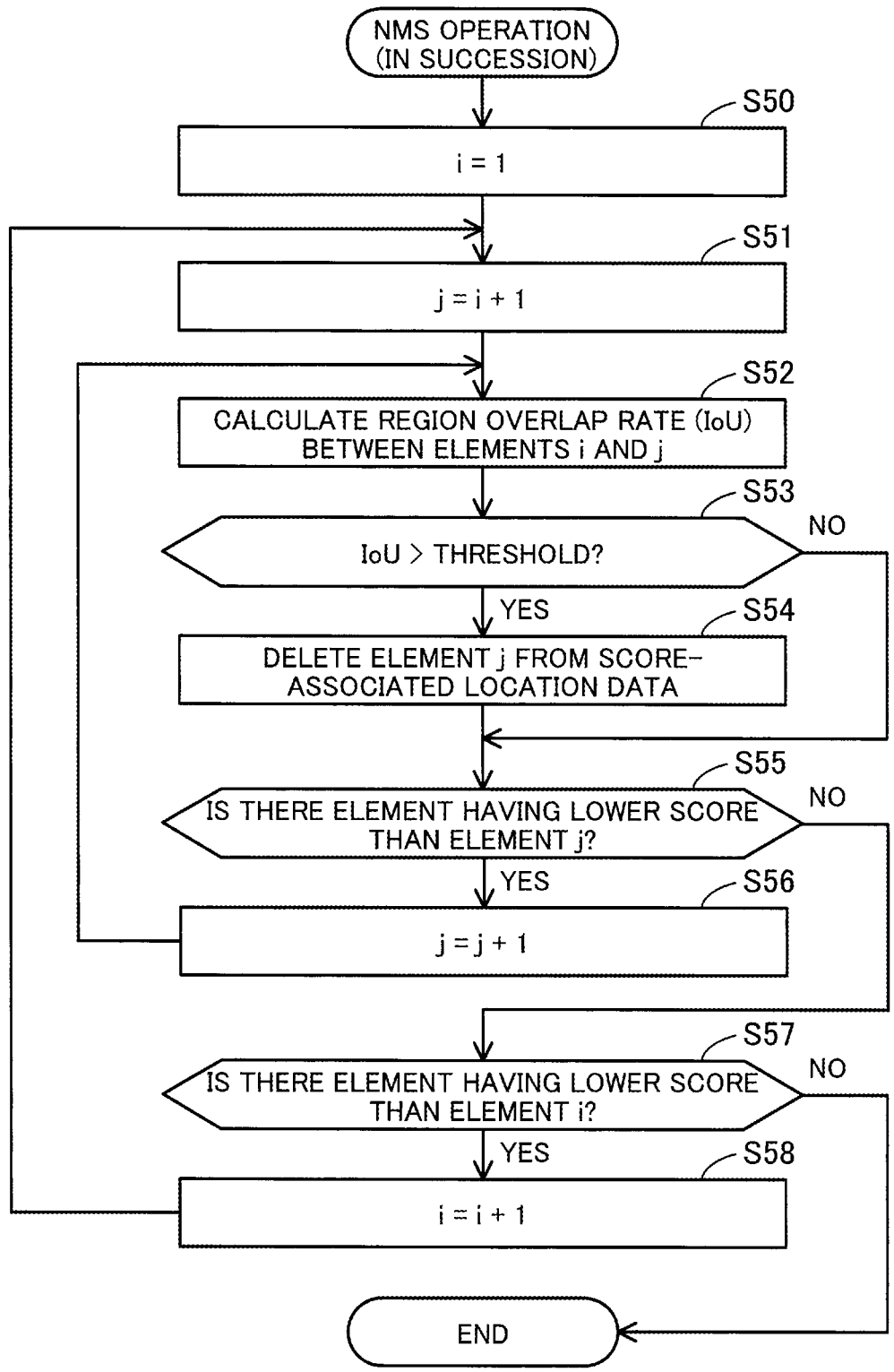
FIG. 23 is a flowchart illustrating an exemplary procedure for an NMS operation executed in succession.

FIG. 23 is a flowchart illustrating an exemplary procedure for an NMS operation executed in succession.

The NMS operation executed in succession may be performed in step S25 above.

(Step S50) The selecting unit 139 initializes a variable i to 1 (i=1).

(Step S51) The selecting unit 139 initializes a variable j to i+1 (j=i+1).

(Step S52) As for object candidate regions individually indicated by the $i^{th}$ element (element i) and the $j^{th}$ element (element j) of the score-associated location data, the selecting unit 139 calculates IoU, i.e., the region overlap rate between these object candidate regions.

(Step S53) The selecting unit 139 determines whether the IoU calculated in step S52 exceeds a threshold (e.g. 0.7). If the IoU exceeds the threshold, the selecting unit 139 moves to step S54. If the IoU is less than or equal to the threshold, the selecting unit 139 moves to step S55.

(Step S54) The selecting unit 139 deletes the element j from the score-associated location data. Note that the deletion of the element j from the score-associated location data may be implemented by setting the score of the element j to a predetermined value, such as the minimum value of the float data type, indicating that the element j is invalid.

(Step S55) The selecting unit 139 determines whether there are one or more elements whose score is lower than that of the element j (i.e., one or more elements ranked lower than the element j). If such an element remains, the selecting unit 139 moves to step S56. If no such element exists, the selecting unit 139 moves to step S57.

(Step S56) The selecting unit 139 updates the variable j to a new value of j+1 (j=j+1). Herewith, the next element ranked in the score-associated location data is set as an element for comparison. Then, the selecting unit 139 moves to step S52.

(Step S57) The selecting unit 139 determines whether there are one or more elements whose score is lower than that of the element i (i.e., one or more elements ranked lower than the element i). If such an element remains, the selecting unit 139 moves to step S58. If no such element exists, the NMS operation ends.

(Step S58) The selecting unit 139 updates the variable i to a new value of i+1 (i=i+1). Herewith, the next element ranked in the score-associated location data is set as a reference element. Then, the selecting unit 139 moves to step S51.

The NMS operation executed in succession has been described above. On the other hand, it is considered effective to parallelize the NMS operation using the GPU 104 with the aid of a bitmap where each bit indicates if corresponding two elements have an IoU greater than a threshold. Next described is parallelization of the NMS operation.

Figure 24:
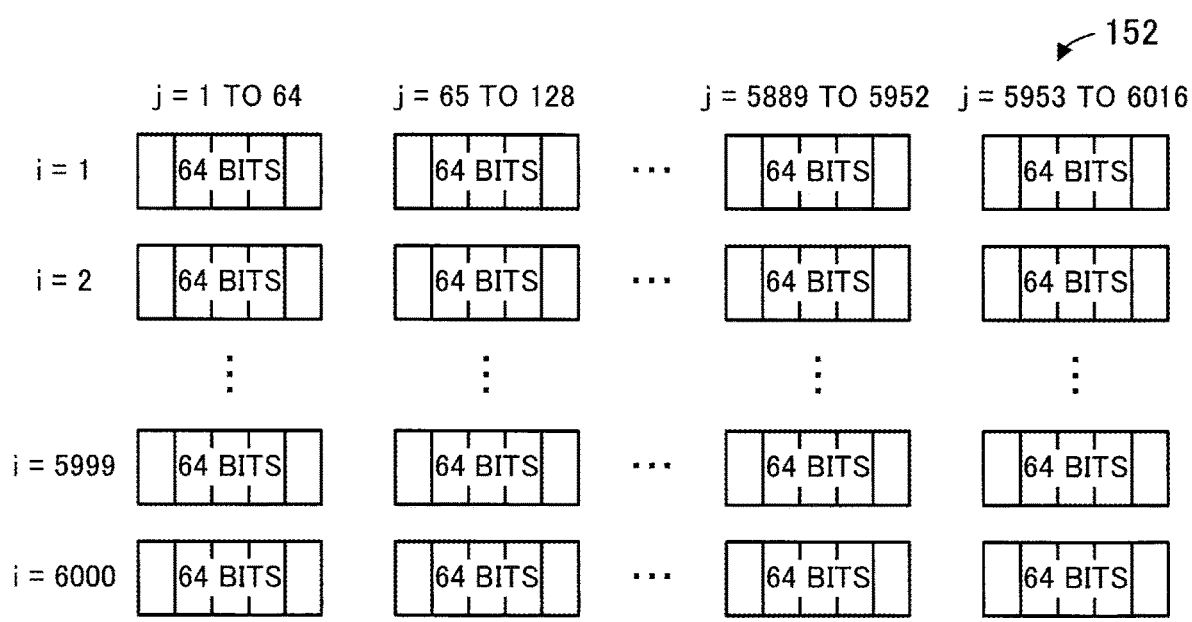
FIG. 24 illustrates an exemplary bitmap.

FIG. 24 illustrates an exemplary bitmap.

A bitmap 152 is a collection of flags each indicating if corresponding two elements in the score-associated location data have an IoU greater than a threshold. The bitmap 152 is a matrix of size 6000 rows by 6016 columns. The first to $6000^{th}$ rows of the bitmap 152 correspond to 6000 elements included in the sorted score-associated location data. The first row corresponds to the first element, the second row corresponds to the second element, and the $6000^{th}$ row corresponds to the $6000^{th}$ element. The first to $6000^{th}$ columns of the bitmap 152 also correspond to the 6000 elements. The first column corresponds to the first element, the second column corresponds to the second element, and the $6000^{th}$ column corresponds to the $6000^{th}$ element. The $6001^{st}$ to $6016^{th}$ columns are dummy columns.

Each flag included in the bitmap 152 is a bit with a value of either 0 or 1, and is set to 0 as an initial value. The flag at row i and column j being 0 indicates that the IoU of the elements i and j is less than or equal to the threshold. On the other hand, the flag at row i and column j being 1 indicates that the IoU of the elements i and j is greater than the threshold. The bitmap 152 treats 64 successive flags along the column direction as one unit bit string. This is because one unit bit string is represented in a 64-bit integer variable in programs.

Since each row includes 94 unit bit strings, the bitmap 152 includes 564,000 unit bit strings (=94×6000). In the case of generating the bitmap 152 using the GPU 104, each thread to be executed by the GPU 104 is assigned to one unit bit string. Therefore, the bitmap 152 is generated in parallel using 564,000 threads.

A thread in charge of the first unit bit string in the first row calculates the IoU between Element #1 and each of Elements #2 to #64 and compares the IoU against the threshold, and then changes the flag of each combination whose IoU exceeds the threshold from 0 to 1. A thread in charge of the second unit bit string in the first row calculates the IoU between Element #1 and each of Elements #65 to #128 and compares the IoU against the threshold, and then changes the flag of each combination whose IoU exceeds the threshold from 0 to 1. Note however that the IoU calculation may be omitted for part of flags in the bitmap 152.

Figure 25:
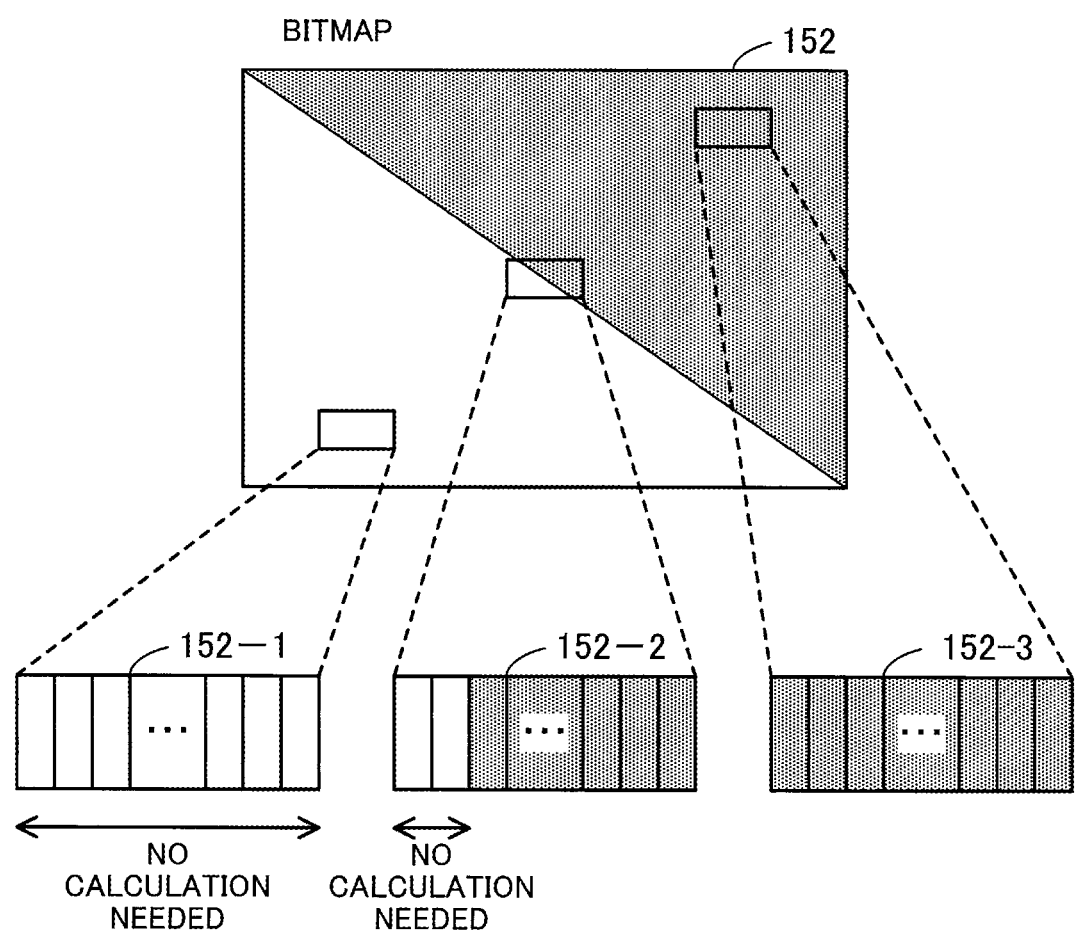
FIG. 25 illustrates an example of skipping overlap determinations.

FIG. 25 illustrates an example of skipping overlap determinations.

As for the calculation of IoU between two different elements, the order of the two elements has no effect on the result of the calculation. That is, amongst flags included in the bitmap 152, a flag at row i and column j and a flag at row j and column i take the same value. In addition, there is no need to calculate IoU between the same elements. Thus, only flags in the upper triangular part of the bitmap 152, excluding the diagonal, need to be determined. Because each thread is in charge of a unit bit string of 64 successive bits along the column direction, there are three different processing patterns, depending on the positional relationship between each unit bit string and the diagonal of the bitmap 152.

The first pattern occurs when an assigned unit bit string lies to the left of the diagonal, as in the case of a unit bit string 152-1 of FIG. 25, or more specifically, when the maximum column number of the assigned unit bit string is less than or equal to its row number. The thread in charge of the unit bit string 152-1 omits the calculation of all the flags for the unit bit string 152-1.

The second pattern occurs when the diagonal intersects an assigned unit bit string, as in the case of a unit bit string 152-2 of FIG. 25, or more specifically, when the maximum column number of the assigned unit bit string is greater than its row number while the minimum column number is less than or equal to the row number. The thread in charge of the unit bit string 152-2 skips calculating, within the unit bit string 152-1, a diagonal flag whose column number is the same as the row number and all flags before the diagonal flag. The thread in charge of the unit bit string 152-2 starts the calculation from a flag just behind the diagonal flag.

The third pattern occurs when an assigned unit bit string lies to the right of the diagonal, as in the case of a unit bit string 152-3 of FIG. 25, or more specifically, when the minimum column number of the assigned unit bit string is greater than its row number. The thread in charge of the unit bit string 152-3 makes the calculation of all the flags for the unit bit string 152-3 with no omission.

According to the second embodiment, when the diagonal intersects a unit bit string, a thread in charge of the unit bit string starts the calculation from an intermediate flag in the unit bit string for the purpose of reducing computational effort. On the other hand, in order to simplify the parallel control, it may be configured such that the thread calculates all the flags for a unit bit string when the diagonal intersects the unit bit string.

Figure 26:
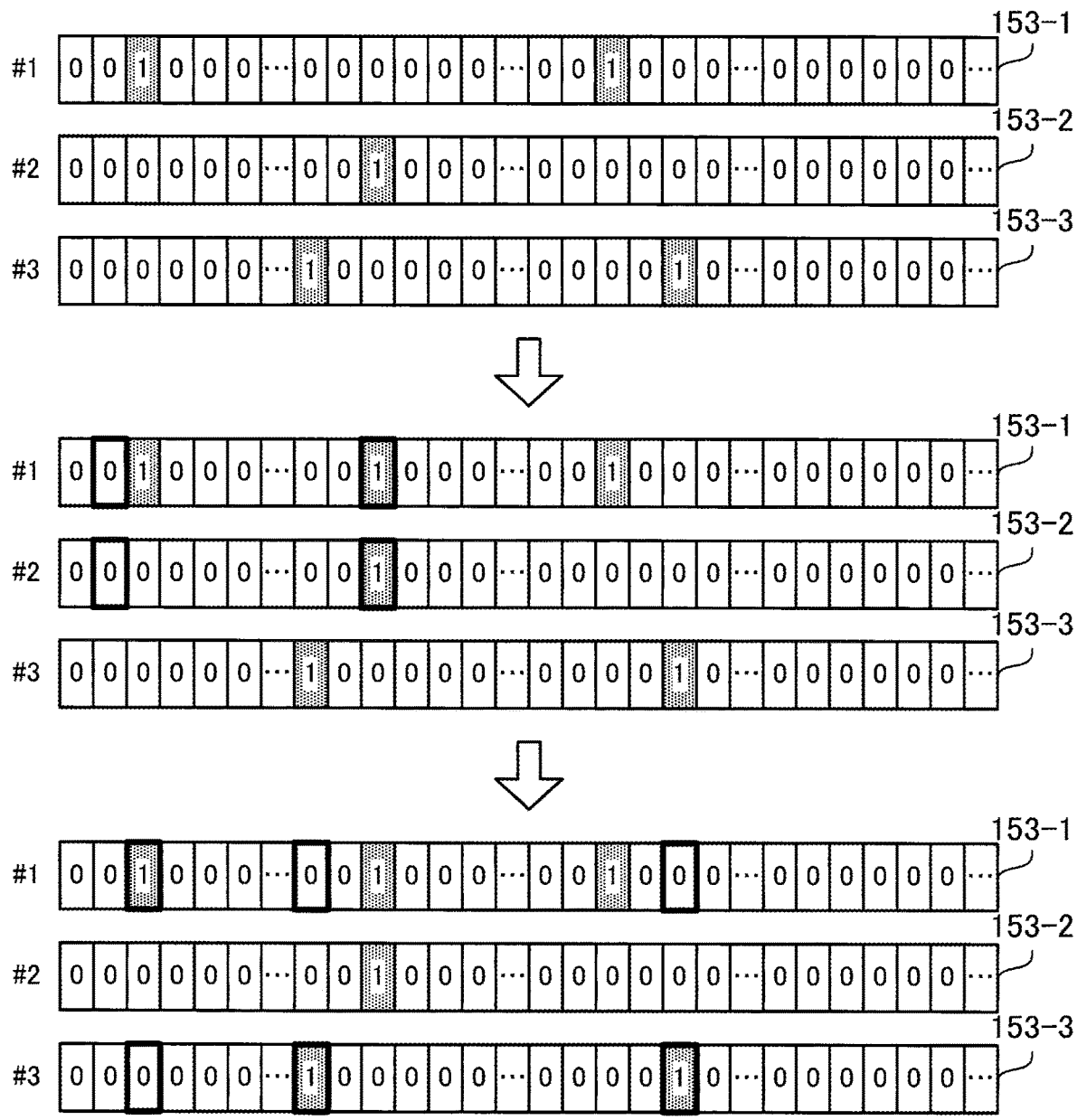
FIG. 26 illustrates an example of aggregating flags in a bitmap.

FIG. 26 illustrates an example of aggregating flags in a bitmap.

Once the bitmap 152 is generated, elements to be deleted are determined in the following manner. A bit string of 6016 bits corresponding to one row of the bitmap 152 is defined as a row bit string. The selecting unit 139 selects the row bit string in the first row as a reference row bit string. The selecting unit 139 aggregates flag information in the second to $6000^{th}$ rows into the reference row bit string.

Specifically, the selecting unit 139 selects a row bit string in the $i^{th}$ row and then checks a flag of the $i^{th}$ column in the reference row bit string. If the flag of the $i^{th}$ column in the reference row bit string is 0, the element i is not to be deleted and therefore has an effect on its lower ranked elements. Hence, the selecting unit 139 incorporates the row bit string in the $i^{th}$ row into the reference row bit string. The incorporation of the row bit string is implemented by performing an inclusive-OR on the two row bit strings so as to copy flags set to 1 in the row bit string of the $i^{th}$ row into the reference row bit string. On the other hand, if the flag of the $i^{th}$ column in the reference row bit string is 1, the element i is to be deleted and therefore has no influence on its lower ranked elements. Hence, the selecting unit 139 ignores the row bit string in the $i^{th}$ row, without incorporating it into the reference row bit string. The selecting unit 139 repeats the above procedure for the second to $6000^{th}$ rows, thereby aggregating the flag information into the reference row bit string. In the reference bit string after the aggregation, elements corresponding to columns whose flags are set to 1 are elements to be deleted.

For example, a row bit string 153-1 is a row bit string in the first row, i.e., the reference row bit string. A row bit string 153-2 is a row bit string in the second row, and a row bit string 153-3 is a row bit string in the third row. The selecting unit 139 refers to the flag in the second column of the row bit string 153-1. Since the flag is 0, the selecting unit 139 changes, to 1, flags in the row bit string 153-1, corresponding to columns whose flags are 1 in the row bit string 153-2. This is implemented by performing an inclusive-OR on the row bit strings 153-1 and 153-2 to thereby update the row bit string 153-1. Subsequently, the selecting unit 139 refers to the flag in the third column of the row bit string 153-1. Since the flag is 1, the selecting unit 139 does not update the row bit string 153-1.

In the case of aggregating flag information of the bitmap 152 using the GPU 104, 64 successive columns in the bitmap 152 are assigned to one thread. This is because it is efficient to aggregate flags by performing a logical operation using a 64-bit integer variable. Because the bitmap 152 includes 64×94 columns, the aggregation is performed in parallel using 94 threads. A thread in charge of the first to $64^{th}$ columns incorporates its corresponding unit bit strings in the second to $6000^{th}$ rows into the corresponding unit bit string in the first row. A thread in charge of the $65^{th}$ to $128^{th}$ columns incorporates its corresponding unit bit strings in the second to $6000^{th}$ rows into the corresponding unit bit string in the first row.

Next described is a procedure for a parallelized NMS operation.

Figure 27:
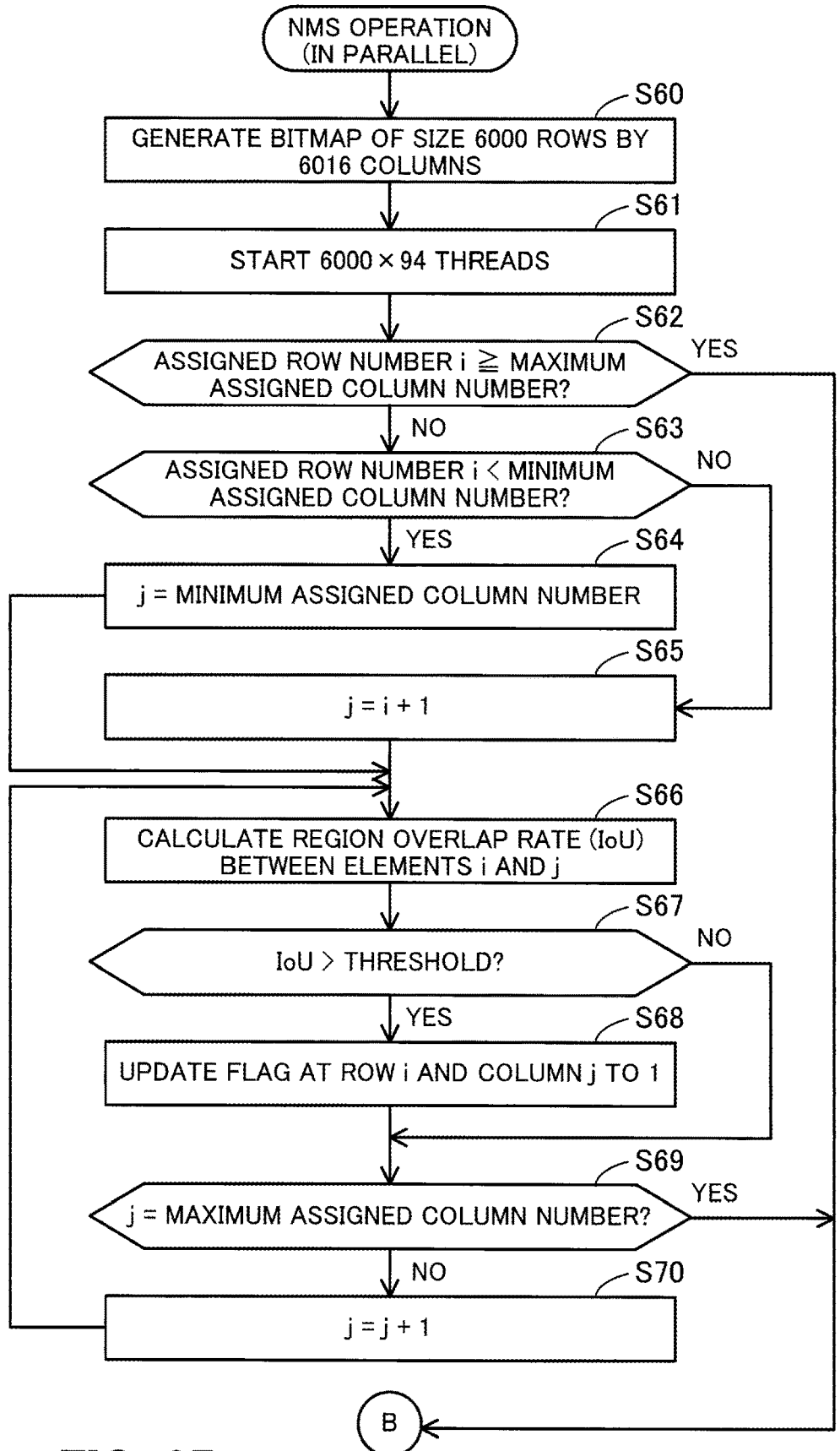
FIG. 27 is a flowchart illustrating an exemplary procedure for an NMS operation executed in parallel.

FIG. 27 is a flowchart illustrating an exemplary procedure for an NMS operation executed in parallel.

The NMS operation executed in parallel is performed in step S25 above.

(Step S60) The selecting unit 139 generates a bitmap of size 6000 rows by 6016 columns and initializes each flag to 0. The 6016 columns are divided into ninety-four 64-bit strings.

(Step S61) The selecting unit 139 starts 6000×94 threads in the GPU 104 and assigns the threads one-to-one to the 6000×94 unit bit strings, each including 64 bits. The subsequent steps S62 to S70 are performed for each unit bit string in parallel.

(Step S62) The selecting unit 139 compares an assigned row number i with a maximum assigned column number of the unit bit string. If the assigned row number i is greater than or equal to the maximum assigned column number, the selecting unit 139 moves to step S71. If the assigned row number i is less than the maximum assigned column number, on the other hand, the selecting unit 139 moves to step S63.

(Step S63) The selecting unit 139 compares the assigned row number i with a minimum assigned column number of the unit bit string. If the assigned row number i is less than the minimum assigned column number, the selecting unit 139 moves to step S64. If the assigned row number i is greater than or equal to the minimum assigned column number, on the other hand, the selecting unit 139 moves to step S65.

(Step S64) The selecting unit 139 sets a variable j to the minimum assigned column number and then moves to step S66.

(Step S65) The selecting unit 139 sets the variable j to a new value of i+1 (j=i+1).

(Step S66) The selecting unit 139 reads the $i^{th}$ element (element i) and the $j^{th}$ element (element j) from the sorted score-associated location data. The selecting unit 139 calculates IoU as the region overlap rate based on the coordinate information of the element i and that of the element j.

(Step S67) The selecting unit 139 determines whether the IoU calculated in step S66 is greater than a threshold (e.g. 0.7). If the IoU is greater than the threshold, the selecting unit 139 moves to step S68. If the IoU is less than or equal to the threshold, the selecting unit 139 moves to step S69.

(Step S68) The selecting unit 139 updates the flag at row i and column j in the bitmap to 1.

(Step S69) The selecting unit 139 determines whether the variable j matches the maximum assigned column number. If the variable j matches the maximum assigned column number, the selecting unit 139 moves to step S71. If not, the selecting unit 139 moves to step S70.

(Step S70) The selecting unit 139 updates the variable j to a new value of j+1 (j=j+1) and then moves to step S66.

Figure 28:
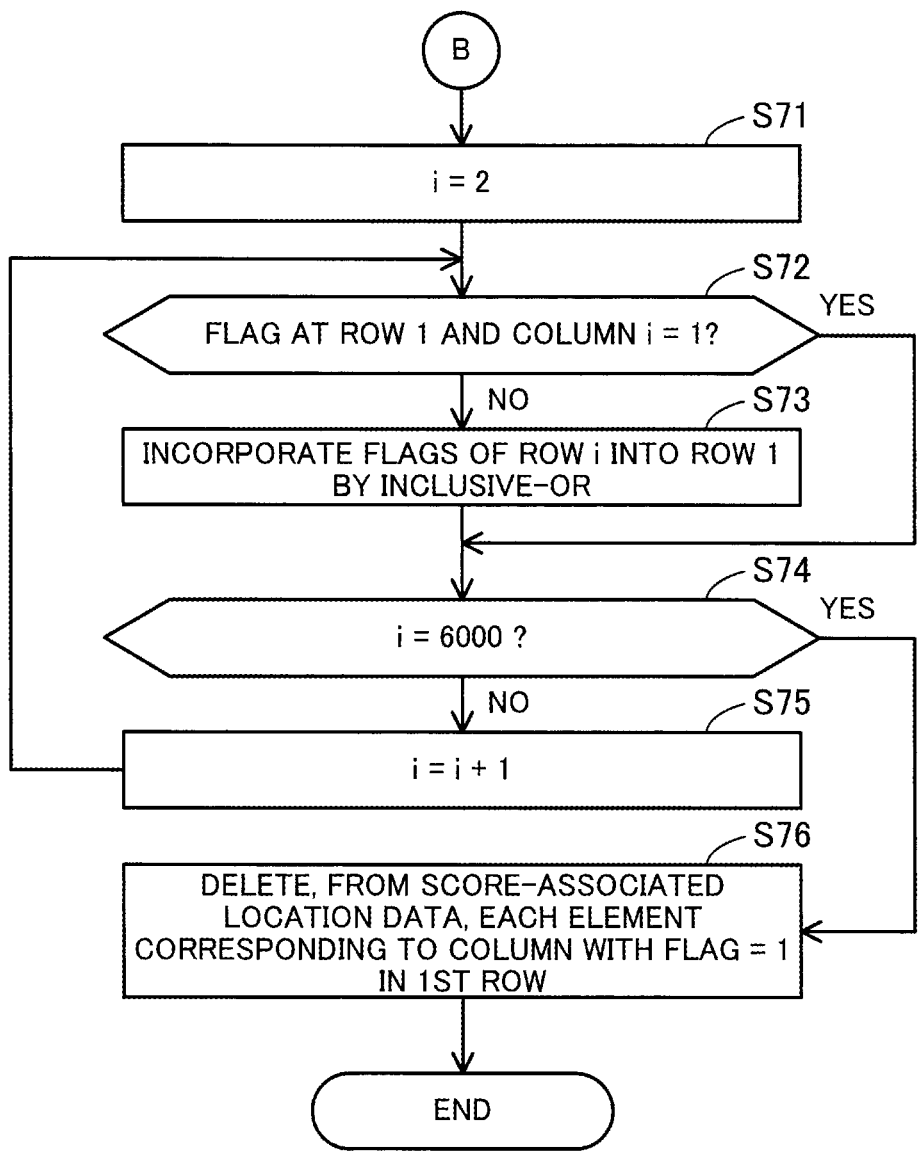
FIG. 28 is a flowchart illustrating the exemplary procedure for the NMS operation executed in parallel, continuing from FIG. 27.

FIG. 28 is a flowchart illustrating the exemplary procedure for the NMS operation executed in parallel, continuing from FIG. 27.

(Step S71) The selecting unit 139 starts 94 threads in the GPU 104 and assigns the threads one-to-one to 94 column sets, each including 64 columns. The subsequent steps S72 to S75 are performed for each column set in parallel. The selecting unit 139 sets the variable i to 2 (i=2).

(Step S72) The selecting unit 139 determines whether the flag at row 1 and column i in the bitmap is 1. If the flag at row 1 and column i in the bitmap is 1, the selecting unit 139 moves to step S74. If the flag at row 1 and column i in the bitmap is 0, the selecting unit 139 moves to step S73.

(Step S73) The selecting unit 139 incorporates flags with a value of 1 in the $i^{th}$ row into the first row by performing an inclusive-OR on the unit bit string in the first row and that in the $i^{th}$ row.

(Step S74) The selecting unit 139 determines whether the variable i equals to 6000 (i=6000). If i=6000, the selecting unit 139 moves to step S76. If i≠6000, the selecting unit 139 moves to step S75.

(Step S75) The selecting unit 139 updates the variable i to a new value of i+1 (i=i+1), and then moves to step S72.

(Step S76) The selecting unit 139 searches the first row of the bitmap for each column with its flag set to 1, and deletes an element corresponding to each found column from the score-associated location data. The deletion of an element from the score-associated location data is achieved by setting the score of the element to a predetermined value, such as the minimum value of the float data type, indicating that the element is invalid.

Next described are effects of image recognition speed-up.

Figure 29:
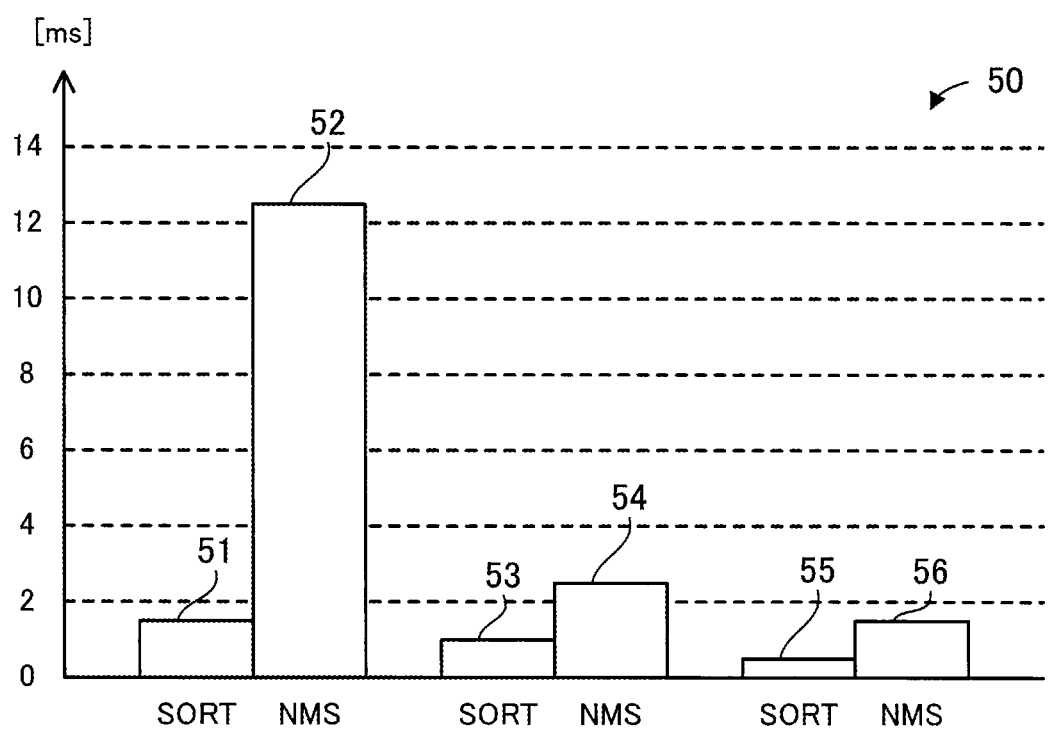
FIG. 29 is a graph with examples of sort run-time and NMS run-time.

FIG. 29 is a graph with examples of sort run-time and NMS run-time.

A graph 50 represents the relationship between sort run-time and methods of sort implementation in the object candidate region generating unit 135. The graph 50 also represents the relationship between NMS run-time and methods of NMS implementation in the object candidate region generating unit 135. The run-time is the time taken to process one input image by faster R-CNN.

A bar 51 represents the run-time of a sort operation performed by a CPU on a generic sort program, and the run-time is about 1.5 milliseconds. A bar 52 represents the run-time of an NMS operation performed by a CPU on an existing image recognition program, and the run-time is about 12.2 milliseconds. A bar 53 represents the run-time of a sort operation performed by a CPU on an existing image recognition program, and the run-time is about 0.9 milliseconds. A bar 54 represents the run-time of an NMS operation by a GPU on an existing image recognition program, and the run-time is about 2.2 milliseconds. A bar 55 represents the run-time of the sort operation according to the second embodiment, and the run-time is about 0.5 milliseconds. A bar 56 is the run-time of the NMS operation according to the second embodiment, and the run-time is about 1.2 milliseconds.

Figure 30:
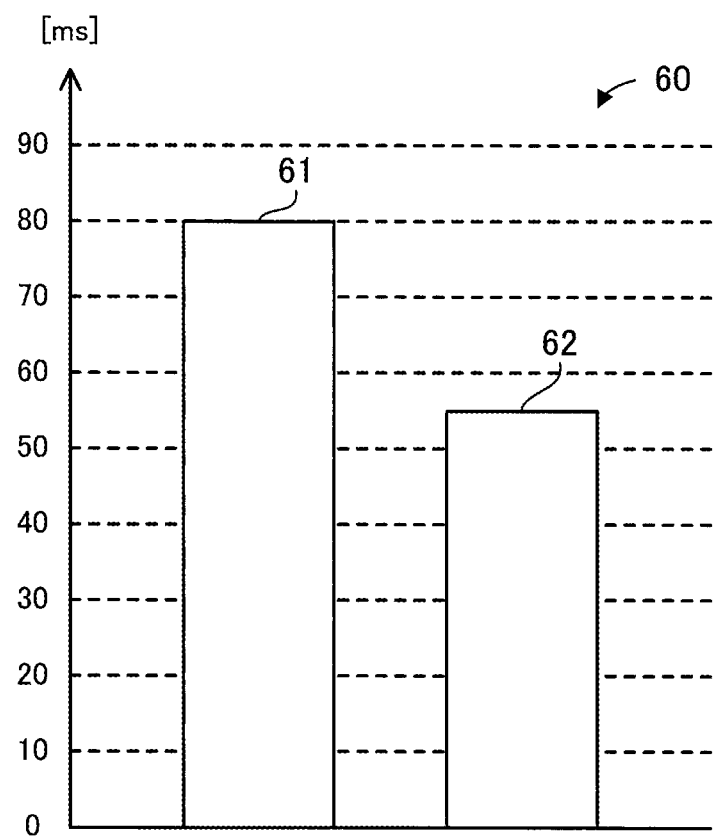
FIG. 30 is a graph with examples of image recognition run-time.

FIG. 30 is a graph with examples of image recognition run-time.

A graph 60 represents the run-time of the entire image recognition for one input image (one frame). Note here that a reduction in the total run-time depicted in FIG. 30 is achieved not only by speeding up the individual sort operation and NMS operation, but also by retaining data in the GPU 104 as far as possible to thereby reduce data transfer between the GPU 104 and the RAM 102.

A bar 61 represents the run-time of the entire image recognition using an existing image recognition program, and the run-time is about 80 milliseconds. On the other hand, a bar 62 represents the run-time of the entire image recognition according to the second embodiment, and the run-time is about 55 milliseconds.

According to the image recognition apparatus 100 of the second embodiment, in the element sort operation performed in the RPN layer, different threads are assigned to different elements, and indexes each indicating the position of a corresponding element in a sorted ordering are calculated in parallel. Then, based on the calculated indexes, a plurality of elements is simultaneously transferred. Herewith, the degree of parallelism is increased, and the sort operation is speeded up using the GPU 104 capable of parallel execution of a large number of threads. In addition, in forming one sorted group from two sorted groups (its own group and the other group), each index indicating the position of a corresponding element in a sorted ordering is calculated by a binary search on the other group using the current position of the element within its own group. This reduces the number of score comparisons.

In the first stage of the sort operation, each streaming multiprocessor locally sorts 1024 elements by concatenating small groups in a stepwise fashion. This allows more elements to be sorted in closed processing within each streaming multiprocessor to a maximum extent, thus reducing memory access. In addition, the minimum group size being eight elements leads to reduced computational effort. In the second stage of the sort operation, a single streaming multiprocessor sorts more than 1024 elements by bubble sort, which also enables reduced memory access. Further, in the second stage of the sort operation, it is possible to increase the degree of parallelism by employing a plurality of streaming multiprocessors.

In the NMS operation performed in the RPN layer, a bitmap is generated in which flags indicate whether the region overlap rate between every two elements exceeds a threshold, and the flags in the bitmap are then aggregated to thereby determine elements to be deleted. This facilitates parallelization of the NMS operation using a plurality of threads, which therefore speeds up the NMS operation with the aid of the GPU 104. In addition, there is no need to calculate the region overlap rates for over half of the flags in the bitmap, thus reducing computational effort for the NMS operation. In this manner, the run-time of image recognition is reduced using the GPU 104.

According to one aspect, it is possible to speed up image recognition.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image recognition apparatus comprising:
   a graphics processing unit (GPU) configured to include a plurality of arithmetic units; and
   a memory configured to store a plurality of data elements, each corresponding to one of a plurality of candidate regions detected in an image and indicating a location and an evaluation value of the corresponding candidate region,
   the GPU executes a process including:
      sorting the plurality of data elements by calculating in parallel, using the plurality of arithmetic units, indexes each indicating a position of a corresponding one of the plurality of data elements in a sorted ordering, in reference to an evaluation value of the corresponding one of the plurality of data elements and evaluation values of at least part of other data elements, and transferring in parallel, after the indexes are calculated, the plurality of data elements based on the indexes using the plurality of arithmetic units, and selecting part of the plurality of candidate regions based on the sorted ordering of the plurality of data elements.

2. The image recognition apparatus according to claim 1, wherein the sorting includes:

dividing the plurality of data elements into a plurality of unit groups, sorting, within each of the plurality of unit groups, data elements belonging to the each of the plurality of unit groups by comparing evaluation values of the data elements, and generating a sorted group from concatenation of two sorted unit groups by calculating indexes each indicating, in an ordering after the concatenation, a position of a corresponding data element belonging to one of the two sorted unit groups, in reference to an ordering position of the corresponding data element within the one of the two sorted unit groups and an ordering position of the corresponding data element within another one of the two sorted unit groups when the corresponding data element is inserted into the another one of the two sorted unit groups.

3. The image recognition apparatus according to claim 1, wherein the sorting includes:

dividing the plurality of data elements into a plurality of blocks each including a predetermined number of data elements, sorting the predetermined number of data elements within each of the plurality of blocks, and extracting, from the plurality of data elements, the predetermined number of data elements in an order of the evaluation values by repeating generation of a sorted concatenated block from concatenation of two sorted blocks, extraction of the predetermined number of data elements from the concatenated block in the order of the evaluation values, and concatenation of the extracted predetermined number of data elements and a different block.

4. The image recognition apparatus according to claim 3, further comprising:

a different memory configured to temporarily store part of the plurality of blocks, wherein the sorting includes loading the two sorted blocks from the memory into the different memory, retaining, in the different memory, the predetermined number of data elements after the concatenation of the two sorted blocks, writing remaining data elements of the concatenated block from the different memory to the memory, and loading the different block from the memory to the different memory.

5. The image recognition apparatus according to claim 3, wherein the sorting includes executing, when a first concatenated block is generated by concatenating a first block and a second block and a second concatenated block is generated by concatenating a third block and the predetermined number of data elements extracted from the first concatenated block, in parallel a process of concatenating a fourth block and the predetermined number of data elements extracted from the second concatenated block and a process of concatenating remaining data elements of the first concatenated block and remaining data elements of the second concatenated block.

6. The image recognition apparatus according to claim 1, wherein:

the plurality of arithmetic units is divided into a plurality of arithmetic unit groups each having a predetermined degree of parallelism, and the sorting includes dividing the plurality of data elements into a plurality of blocks each including a number of data elements corresponding to the predetermined degree of parallelism, and executing a first process and a second process using different sorting methods, the first process sorting the corresponding number of data elements within each of the plurality of blocks, and the second process concatenating the plurality of blocks individually sorted.

7. The image recognition apparatus according to claim 1, wherein the plurality of arithmetic units is processor cores installed on the GPU, and the memory is installed on the GPU.

8. An image recognition method comprising:

acquiring, by a graphics processing unit (GPU), a plurality of data elements each corresponding to one of a plurality of candidate regions detected in an image and indicating a location and an evaluation value of the corresponding candidate region;

calculating in parallel, by the GPU, using a plurality of arithmetic units of the GPU, indexes each indicating a position of a corresponding one of the plurality of data elements in a sorted ordering, in reference to an evaluation value of the corresponding one of the plurality of data elements and evaluation values of at least part of other data elements;

sorting, by the GPU, the plurality of data elements by transferring in parallel, after the indexes are calculated, the plurality of data elements based on the indexes using the plurality of arithmetic units; and selecting, by the GPU, part of the plurality of candidate regions based on the sorted ordering of the plurality of data elements.

9. A non-transitory computer-readable recording medium storing therein a computer program that causes a computer to execute a process comprising:

acquiring a plurality of data elements, each corresponding to one of a plurality of candidate regions detected in an image and indicating a location and an evaluation value of the corresponding candidate region;

calculating in parallel, using a plurality of arithmetic units of a graphics processing unit (GPU) included in the computer, indexes each indicating a position of a corresponding one of the plurality of data elements in a sorted ordering, in reference to an evaluation value of the corresponding one of the plurality of data elements and evaluation values of at least part of other data elements;

sorting the plurality of data elements by transferring in parallel, after the indexes are calculated, the plurality of data elements based on the indexes using the plurality of arithmetic units; and selecting part of the plurality of candidate regions based on the sorted ordering of the plurality of data elements.

* * * * *